US010771419B2

(12) United States Patent
Charignon

(10) Patent No.: US 10,771,419 B2
(45) Date of Patent: Sep. 8, 2020

(54) PROVIDING CONTEXT-AWARE VISUAL ELEMENTS IN A COMMUNICATION SETTING

(71) Applicant: Facebook, Inc., Menlo Park, CA (US)

(72) Inventor: Laurent Gabriel Stephane Charignon, Mountain View, CA (US)

(73) Assignee: FACEBOOK, INC., Menlo Park, CA (US)

( * ) Notice: Subject to any disclaimer, the term of this patent is extended or adjusted under 35 U.S.C. 154(b) by 226 days.

(21) Appl. No.: 15/361,761

(22) Filed: Nov. 28, 2016

(65) Prior Publication Data

US 2018/0152403 A1    May 31, 2018

(51) Int. Cl.
*H04L 12/58* (2006.01)
*H04L 29/08* (2006.01)
*H04L 29/06* (2006.01)

(52) U.S. Cl.
CPC ............ *H04L 51/16* (2013.01); *H04L 51/043* (2013.01); *H04L 63/104* (2013.01); *H04L 67/22* (2013.01); *H04L 51/04* (2013.01)

(58) Field of Classification Search
CPC ......... H04L 51/16; H04L 67/22; H04L 51/04; H04L 51/043; H04L 63/104
See application file for complete search history.

(56) References Cited

U.S. PATENT DOCUMENTS

| | | | | |
|---|---|---|---|---|
| 6,404,438 B1* | 6/2002 | Hatlelid | ................... | G06F 3/033 345/473 |
| 6,640,230 B1* | 10/2003 | Alexander | ........... | G06Q 10/107 |
| 6,731,323 B2* | 5/2004 | Doss | ....................... | H04N 7/147 348/14.01 |
| 7,043,530 B2* | 5/2006 | Isaacs | ..................... | H04L 51/04 709/204 |
| 7,133,900 B1* | 11/2006 | Szeto | ..................... | H04L 51/04 709/206 |
| 7,689,649 B2* | 3/2010 | Heikes | ................. | G06Q 10/107 709/203 |
| 9,065,786 B2* | 6/2015 | Plotkin | ................... | H04L 51/02 |
| 9,256,861 B2* | 2/2016 | Blattner | .............. | G06Q 10/107 |
| 9,807,130 B2* | 10/2017 | Blattner et al. | ......... | H04L 51/04 709/204 |
| 2002/0083028 A1* | 6/2002 | Na | ........................ | H04M 1/663 706/45 |
| 2002/0184309 A1* | 12/2002 | Danker | ................... | G06F 17/27 709/204 |
| 2003/0005058 A1* | 1/2003 | Sorotzkin | ............ | G06Q 10/107 709/206 |
| 2003/0210265 A1* | 11/2003 | Haimberg | .............. | H04L 51/04 715/758 |

(Continued)

*Primary Examiner* — Oanh Duong

(74) *Attorney, Agent, or Firm* — Keller Jolley Preece

(57) ABSTRACT

One or more embodiments of the disclosure provide a context-aware communication system for efficiently providing a sender of an electronic communication message with the communication context of a recipient. The communication context provides the sender with one or more indications regarding the activity, situation, or environment of the recipient user, which enables the sender to informatively decide whether to send an electronic communication message to the recipient. As disclosed herein, the context-aware communication system determines a recipient's communication context based on behavior characteristics of the recipient.

20 Claims, 15 Drawing Sheets

(56) References Cited

U.S. PATENT DOCUMENTS

| | | | | |
|---|---|---|---|---|
| 2003/0222907 | A1* | 12/2003 | Heikes | G06Q 10/107 |
| | | | | 715/745 |
| 2015/0222576 | A1* | 8/2015 | Anderson | G06F 3/04817 |
| | | | | 715/752 |
| 2015/0256666 | A1* | 9/2015 | Peterson | H04M 1/72552 |
| | | | | 455/412.1 |
| 2016/0205052 | A1* | 7/2016 | DeLuca | H04L 51/12 |
| | | | | 709/206 |
| 2017/0026333 | A1* | 1/2017 | Pitroda | H04L 51/14 |
| 2017/0199866 | A1* | 7/2017 | Gunaratna | G06F 17/271 |
| 2017/0200093 | A1* | 7/2017 | Motahari Nezhad | |
| | | | | G06N 99/005 |
| 2017/0374001 | A1* | 12/2017 | Ifrim | H04L 43/045 |
| 2018/0137400 | A1* | 5/2018 | Deselaers | G06N 3/0445 |

\* cited by examiner

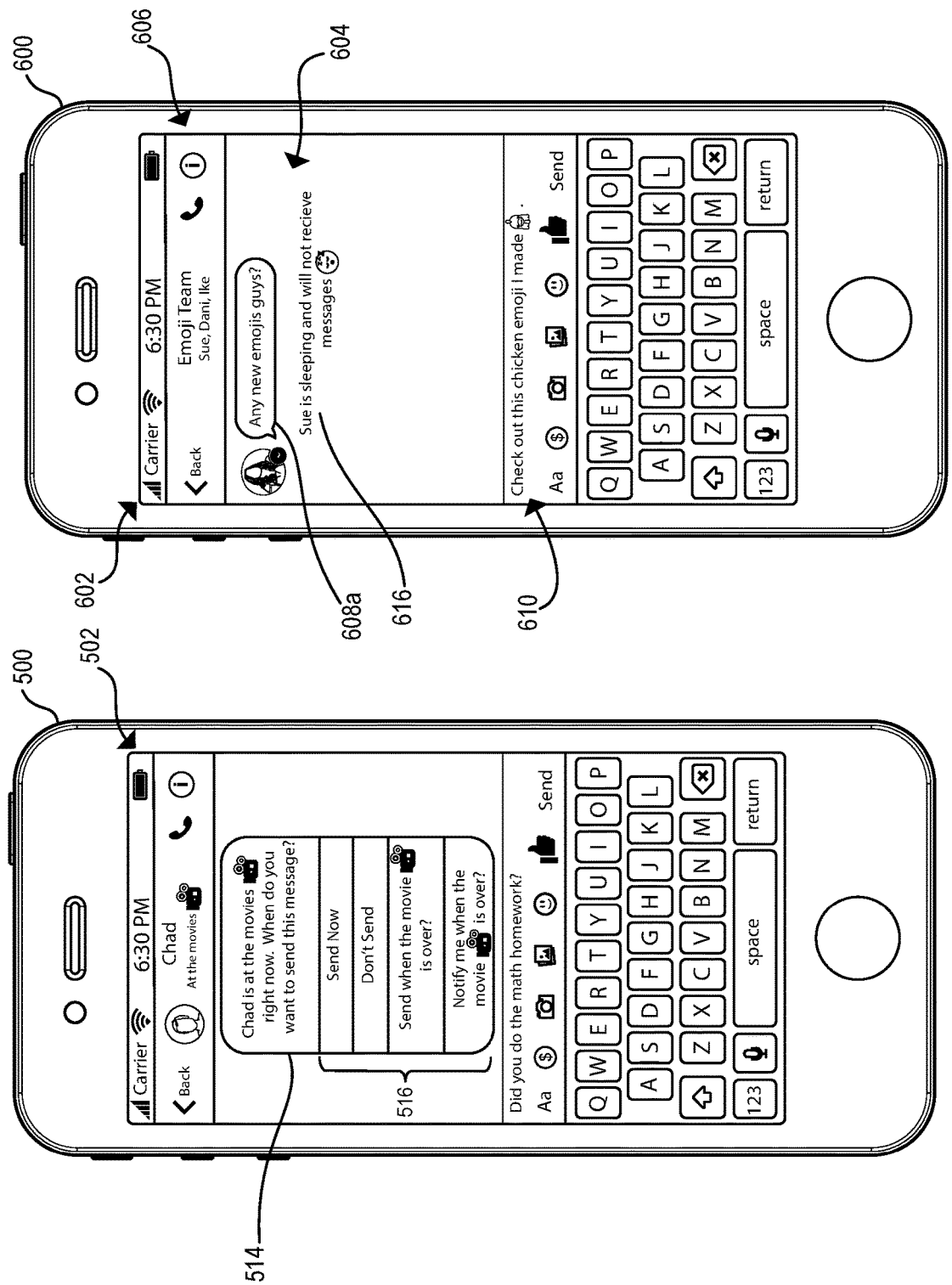

PROVIDING CONTEXT-AWARE VISUAL ELEMENTS IN A COMMUNICATION SETTING

BACKGROUND

Advances in modern communication systems and technologies have increased the ability for people to connect. A current form of popular communication is electronic messaging. Users such as family, friends, and co-workers often send numerous electronic messages to each other daily. In general, a user employs electronic messaging applications to send and receive electronic messages with another user or a group of users. For example, conventional electronic messaging systems often provide a graphical user interface that displays a message thread that includes previous electronic messages between the participating users.

Despite recent advancements, however, conventional messaging systems suffer from a number of drawbacks. For example, due to the nature of electronic messages, many conventional systems immediately send electronic messages to a recipient regardless of the recipient's availability, which can cause interruptions and disruptions to the recipient. While some conventional systems allow recipients to manually set their status as "away" or "busy," these statuses are too generic and do not provide a sender with adequate information as to why a recipient is away or busy. Moreover, in many conventional systems, even in the event that a recipient's status is set to "away" or "busy," the recipient will still be interrupted (e.g., with a new message notification) when a sender proceeds to send an electronic message, despite the recipient's status. Further, many recipients forget to change their status back from "away" or "busy" when they are again available, thus causing confusion.

In addition, some conventional systems provide an indication of when a recipient is currently "online" or when a recipient was last active on a messaging application. However, while these conventional systems help a sender know that a recipient is active on the messaging application, these systems also fail to provide sufficient detail regarding the recipient. For example, a recipient may be active online, but the recipient may still be unavailable or want to avoid interruption. Accordingly, while many conventional systems indicate whether a recipient is active online, the indication of online activity alone is insufficient to assist a sender in knowing whether communicating with the recipient would inconvenience, disrupt, irritate, or interrupt the recipient.

These and other disadvantages exist with respect to conventional systems and methods of sending electronic messages.

SUMMARY

Embodiments of the present disclosure provide benefits and solve one or more of the preceding or other problems in the art by employing systems and methods that provide a sender user (or simply "sender") of an electronic communication with context-aware information regarding a potential recipient user (or simply "recipient"). In particular, the disclosed systems and methods provide a sender with one or more indications regarding the current activity, situation, and/or environment of the recipient, which enables the sender to informatively decide whether to immediately send an electronic communication message (or simply "message") to the recipient, wait before sending the message, or not send the message at all.

To illustrate, in one or more embodiments, the systems and methods monitor activity data received from a recipient's client device. Upon analyzing the recipient's activity data, the disclosed systems and methods identify a plurality of behavior characteristics of the recipient. Based on the plurality of behavior characteristics, the systems and methods determine a communication context of the recipient. In addition, the systems and methods provide the communication context to the sender client device, which in turn, displays a visual element corresponding to the communication context of the recipient. The visual element informs the sender of the recipient's current communication context of the recipient, and accordingly, enables the sender to make an informative decision whether to send a message to the recipient based on the importance of the message in light of the recipient's communication context.

Additional features and advantages are outlined in the description that follows, and in part will be obvious from the description, or may be learned by the practice of embodiments disclosed herein.

BRIEF DESCRIPTION OF THE DRAWINGS

To better describe the manner in which the systems and methods obtain the advantages and features of the disclosed embodiments, a number of example embodiments are described in connection with accompanying drawings, as follows.

FIGS. 5A-5C illustrate examples of a graphical user interface that provides a sender with an active visual element corresponding to a communication context in accordance with one or more embodiments described herein.

FIGS. 6A-6C illustrate examples of a graphical user interface that provides a communication context indication for a recipient within a group message in accordance with one or more embodiments described herein.

DETAILED DESCRIPTION

Figure 1:
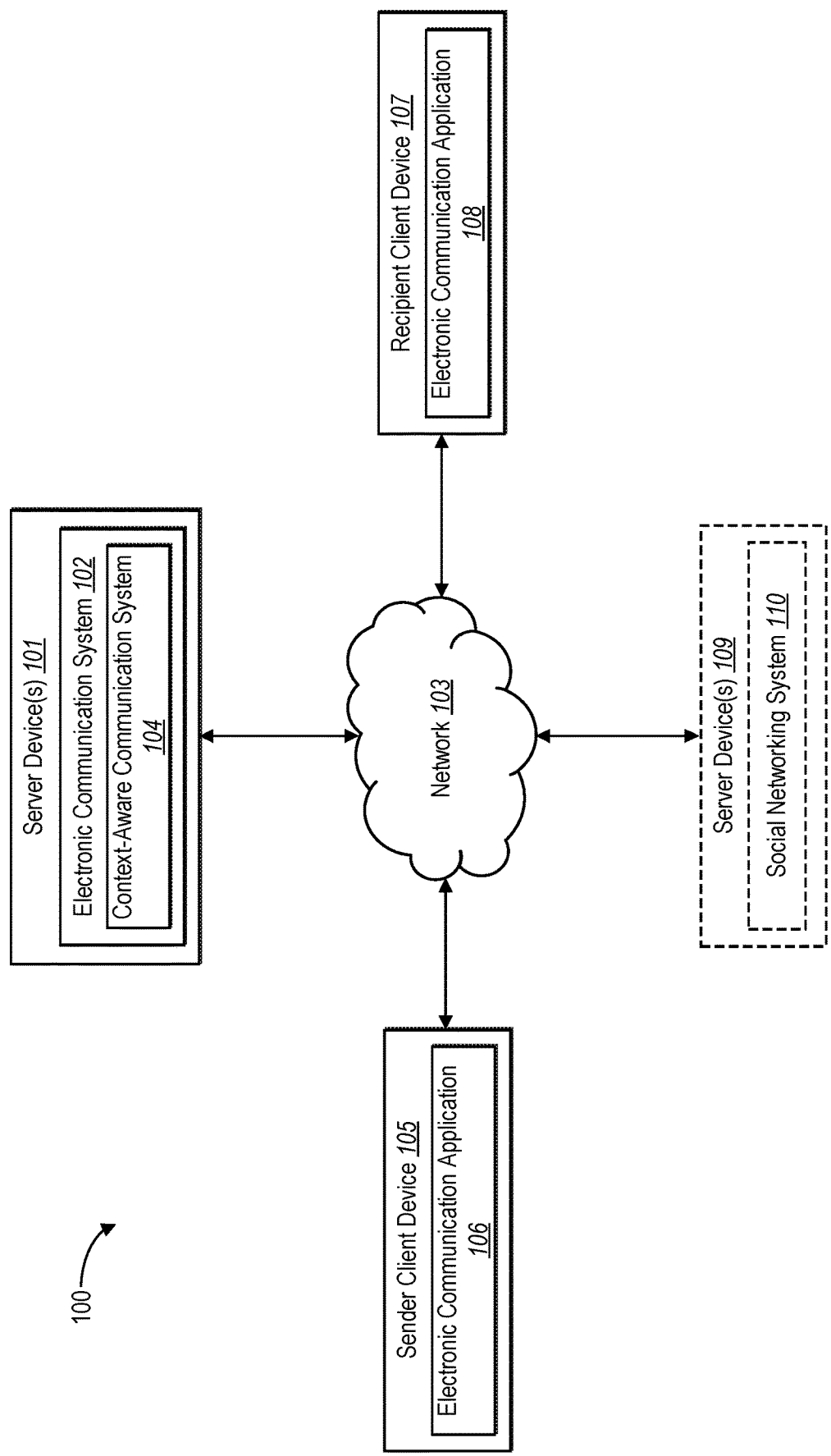
FIG. 1 illustrates an example embodiment of a communication environment in accordance with one or more embodiments described herein.

The embodiments disclosed herein describe a context-aware communication system that improves communications between a sender user (or simply "sender") and a recipient user (or simply "recipient"). In general, the context-aware communication system determines a communication context of one or more potential recipients to provide to a sender user. For example, the context-aware communication system provides a communication context of a recipient to a sender upon the sender initiating an electronic communication message (or simply "message") with the recipient. More specifically, the context-aware communication system receives an indication from a sender client device that the sender has initiated a message with the recipient (e.g., opened a message thread corresponding to the recipient). Based on receiving the indication, the context-aware communication system provides the recipient's communication context to the sender client device that causes the sender client device to display a visual element (e.g., an emoji), that conveys the recipient's context to the sender. As such, the context-aware communication system enables the sender to make an informed decision regarding whether the message would be interruptive to the recipient if the context-aware communication system delivered the message.

More specifically, the context-aware communication system, in one or more embodiments, monitors activity data received from a recipient client device (e.g., a client device associated with a recipient). For example, the context-aware communication system monitors user input on the recipient client device, time zone data, geolocation information, and other data received from the recipient client device. The context-aware communication system uses the activity data to identify behavior characteristics of the recipient. Examples of behavior characteristics, include, but are not limited to, a recipient's location, movement, local time zone, social media data, biometric data, behavioral patterns, and/or device engagement data. Using the behavior characteristics, the context-aware communication system determines, infers, and/or estimates a communication context for the recipient.

In one or more embodiments, communication context information is monitored and shared based on user permissions. For example, in some embodiments, before determining a communication context for a recipient, the context-aware communication system receives authorization and/or permission from a recipient to monitor activity data, identify behavior characteristics, and determine the recipient's communication context. In addition, the context-aware communication system may receive sharing permissions from a recipient indicating other user's with whom the context-aware communication system shares the recipient's communication context.

Based upon monitoring activity data and determining a communication context for a recipient, the context-aware communication system provides the recipient communication context to a sender. For instance, in some embodiments, the context-aware communication system receives an indication from a sender client device (e.g., a client device associated with a sender) that a sender is preparing to send a message (e.g., an instant message, email, etc.) to the recipient. Before the sender requests delivery of the message (e.g., prior to selecting a "send" option), the context-aware communication system provides the recipient's communication context to the sender via the sender client device. In some instances, the communication context indicates to the sender that the recipient is engaged in an activity that would likely interrupt the recipient (i.e., a negative communication context). As such, the context-aware communication system enables the sender to decide if need to send the message outweighs interrupting the recipient based on the recipient's communication context.

As mentioned above, the context-aware communication system provides a communication context of a recipient to a sender in a way that causes the sender client device to display a visual element to indicate the communication context. For example, in one or more embodiments, the context-aware communication system sends, to the sender's client device, a visual element corresponding to the recipient's communication context and causes the sender's client device to display the visual element in connection with the recipient. Some visual elements are passive (e.g., an emoji or interface theme) while others are active (e.g., popup windows with selectable options). Additional examples are provided below in connection with the figures.

In the event the context-aware communication system determines that a recipient has a negative communication context, in some embodiments, the context-aware communication system provides various options to the sender's client device based on the negative communication context. For example, the context-aware communication system can cause the sender client device to provide an option to deliver the message at a later time when delivery is less intrusive to the recipient (e.g., upon detecting a positive communication context for the recipient), or an option to notify the sender when the recipient no longer has a negative communication context, at which point the sender can decide if sending the message is still relevant. Another delivery option can include the option to deliver the message and delay notifying the recipient of delivery until the recipient's communication context changes to indicate a positive communication context.

As indicated in the above, the context-aware communication system provides a number of additional advantages benefits over conventional messaging systems. For example, the context-aware communication system provides senders with additional information regarding the communication context of a recipient. A communication context corresponding to a recipient provides a sender with more information than the conventional statuses of "online," "offline," "away," or "busy." Rather, by providing the communication context of a recipient, the context-aware communication system allows the sender to weigh the importance of sending a message versus disrupting the recipient based on specific communication context information.

Further, in contrast to conventional systems that merely provide the last active time of a recipient or whether a recipient is online, the context-aware communication system informs the sender of why the recipient is not active. Moreover, if the recipient is online, the context-aware communication system can further indicate whether the recipient is in a situation that, although online, the recipient may not want the sender to interrupt them with a message. Accordingly, based a sender knowing a recipient's communication context, the sender can make a conscious and informed decision to send a particular message. These and other advantages are discussed in more detail with respect to the figures.

For example, FIG. 1 shows a communication environment 100 in which a context-aware communication system 104 operates. As shown, the communication environment 100 includes the context-aware communication system 104 and enables operation of one or more example embodiments of the context-aware communication system 104. As illustrated, the context-aware communication system 104 resides on an electronic communication system 102 and is hosted on one or more server devices 101.

FIG. 1 also shows the context-aware communication system 104 communicating via a network 103 with a sender client device 105 (associated with a sender) and a recipient client device 107 (associated with a recipient). In particular, the context-aware communication system 104 sends and receives electronic communication, such as messages (i.e., electronic communication messages) using an electronic communication application 106 on the sender client device 105 and an electronic communication application 108 on the recipient client device 107. Each electronic communication application 106, 108 enables the corresponding client device to send and receive electronic communications using the context-aware communication system 104.

As mentioned above, the one or more server device(s) 101, which hosts the electronic communication system 102 and the context-aware communication system 104, communicate with the sender client device 105 and the recipient client device 107 via the network 103. Although FIG. 1 illustrates a particular arrangement of the various components within the communication environment 100, various additional arrangements are possible. For example, the context-aware communication system 104 communicates directly with the sender client device 105 and the recipient client device 107. Further, while the communication environment 100 displays a single sender client device 105 and recipient client device 107, one will appreciate based on the disclosure herein that the communication environment 100 can include any number of sender client devices and recipient client devices. Additional details regarding the various computing devices and networks are explained below with respect to FIG. 10.

In some embodiments, the communication environment 100 includes a social networking system 110. FIG. 1 illustrates that one or more optional server device(s) 109 host an optional social networking system 110 when the social networking system is included in the communication environment 100. The social networking system 110 can connect the sender and recipient together via various interests, people connections, and groups. Additional information regarding the social networking system 110 is provided below in connection with FIGS. 11-12.

In one or more embodiments, the electronic communication system 102 operates within or in connection with the social networking system 110. For example, the social networking system 110 hosts both the electronic communication system 102 and the context-aware communication system 104. For instance, the sender and recipient are connected via the social networking system 110 and, as such, can communicate with each other via the context-aware communication system 104 within the social networking system 110. In addition, preferences and permission set by a recipient in the social networking system 110 can carry over to the context-aware communication system 104.

As mentioned above, the communication environment 100 includes the context-aware communication system 104 as part of the electronic communication system 102. As a brief overview, the context-aware communication system 104 determines the communication context of a recipient and provides the communication context to the sender client device 105 for presentation to a sender. For example, the context-aware communication system 104 determines a recipient's communication context based on multiple behavior characteristics. Then, based on a sender accessing the electronic communication application 106 on the sender client device 105 to send a message to the recipient, the context-aware communication system 104 provides the communication context to the sender via the sender client device 105. By providing the communication context of the recipient to the sender client device 105, the context-aware communication system 104 enables the sender to make an informed choice as to whether the sender should send the message.

Additional details concerning the context-aware communication system 104 providing a communication context of a recipient are described further in connection with the below figures. In order to provide a clear explanation of the below embodiments of the context-aware communication system, various terms used through this description are defined below. The below definitions are further supplemented by the various examples given through the description of the figures.

As used herein, the term "electronic communication" refers to any type of digital communication between computing devices. For example, the term "electronic communication message" (or simply "message") refers to any communication sent between a sender and a recipient via their respective client devices. Examples of a message include, but are not limited to text-based messages: instant messages, text messages, e-mail, and chat; and multimedia-based messages: picture messages, audio calls, videos call, and videos streams. One will appreciate that while the present application often provides examples in the form of instant messages, the context-aware communication system can apply the principles and teachings here to other forms of electronic communication. Moreover, as used herein, the term "electronic communication system" generally refers to any system that facilitates the exchange of electronic communications.

As used herein, the term "communication context" refers to a determined state of a user that may inform the desire or ability of the user to receive a message. For example, a communication context can be or relate to an activity, a situation, and/or an environment of a user (e.g., a potential recipient user of a message), examples of a communication context include, but are not limited to, sleeping, eating, watching a movie, attending a meeting, exercising, driving, and/or other activities, situations, or environments. As used herein, the term "positive communication context" indicates a determined state where a user would likely have the desire and/or ability to receive a message. On the other hand, the term "negative communication context" indicates a determined state where a user would likely not have the desire and/or ability to receive a message.

A communication context may be based on one or more behavior characteristics. As used herein, the term "behavior characteristic" refers to data associated with a user that can be used to determine a communication context for a user (e.g., a potential recipient of a message). For example, a behavior characteristic can include user input data (e.g., a social media post, a message, etc.) that the context-aware communication system 104 uses to determine an availability or willingness of a user to receive a message. Moreover, a behavior characteristic can include client device generated data (e.g., GPS location data, local time zone data, speed/acceleration data, calendar data, etc.) that the context-aware communication system 104 uses to determine an availability or willingness of a user to receive a message. Additionally, a behavior characteristic can include behavior pattern data (e.g., data based on a user's past actions and patterns) that context-aware communication system 104 uses to determine an availability or willingness of a user to receive a message.

Figure 2A:
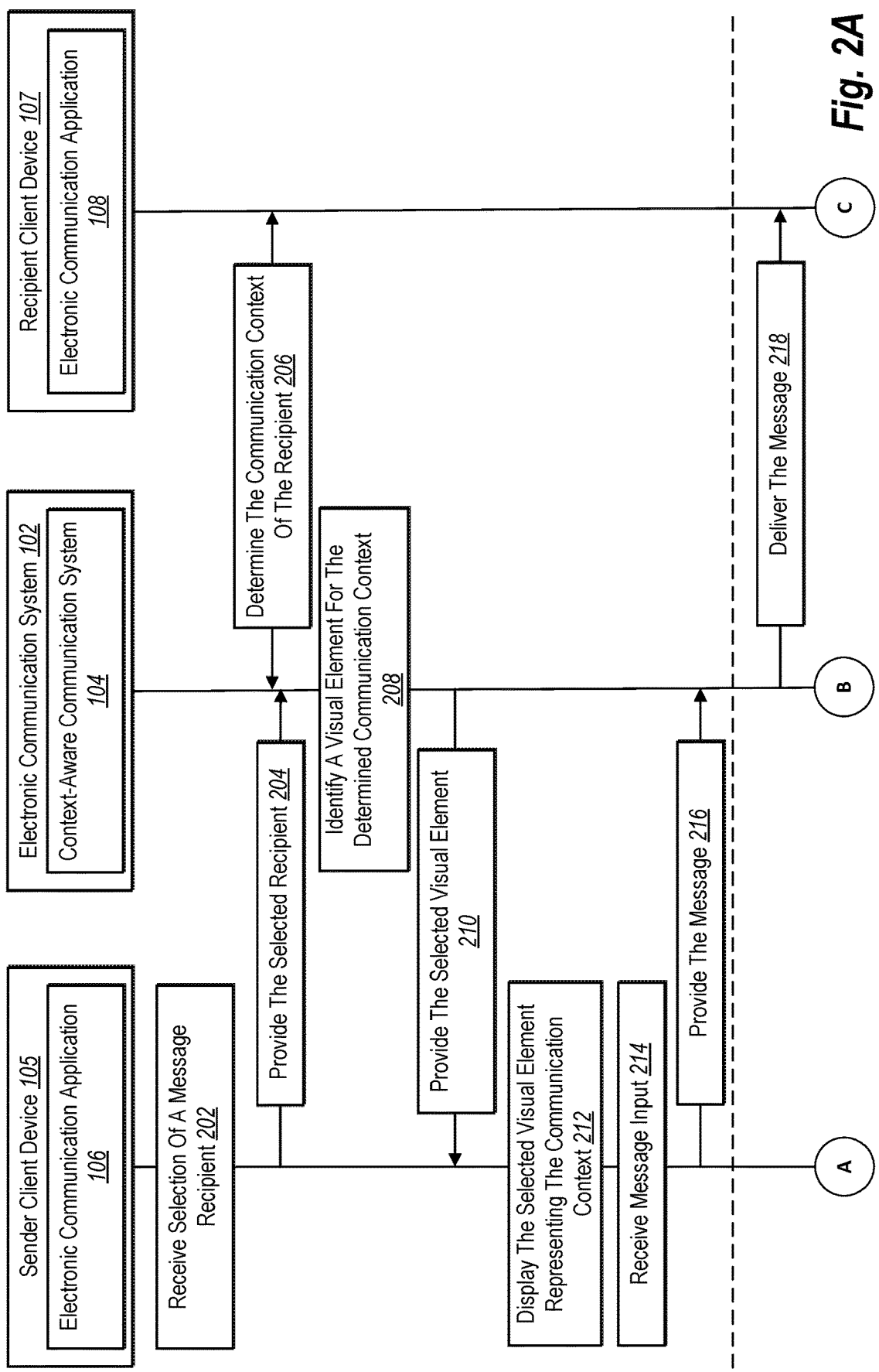
FIGS. 2A-2C illustrate various sequence diagrams of a context-aware communication system providing a communication context of a recipient to a sender in accordance with one or more embodiments described herein.
Figure 2B:
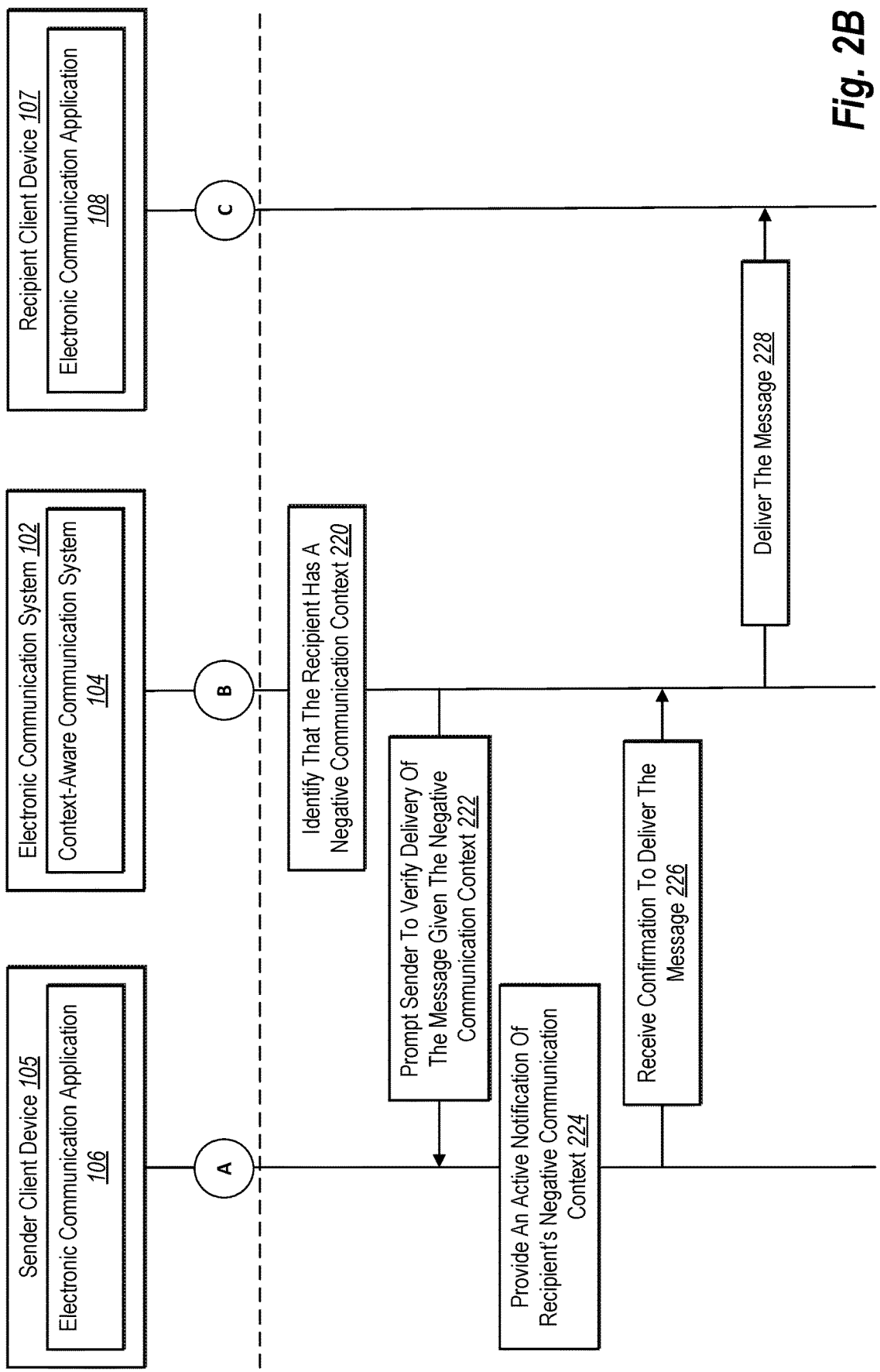
Figure 2C:
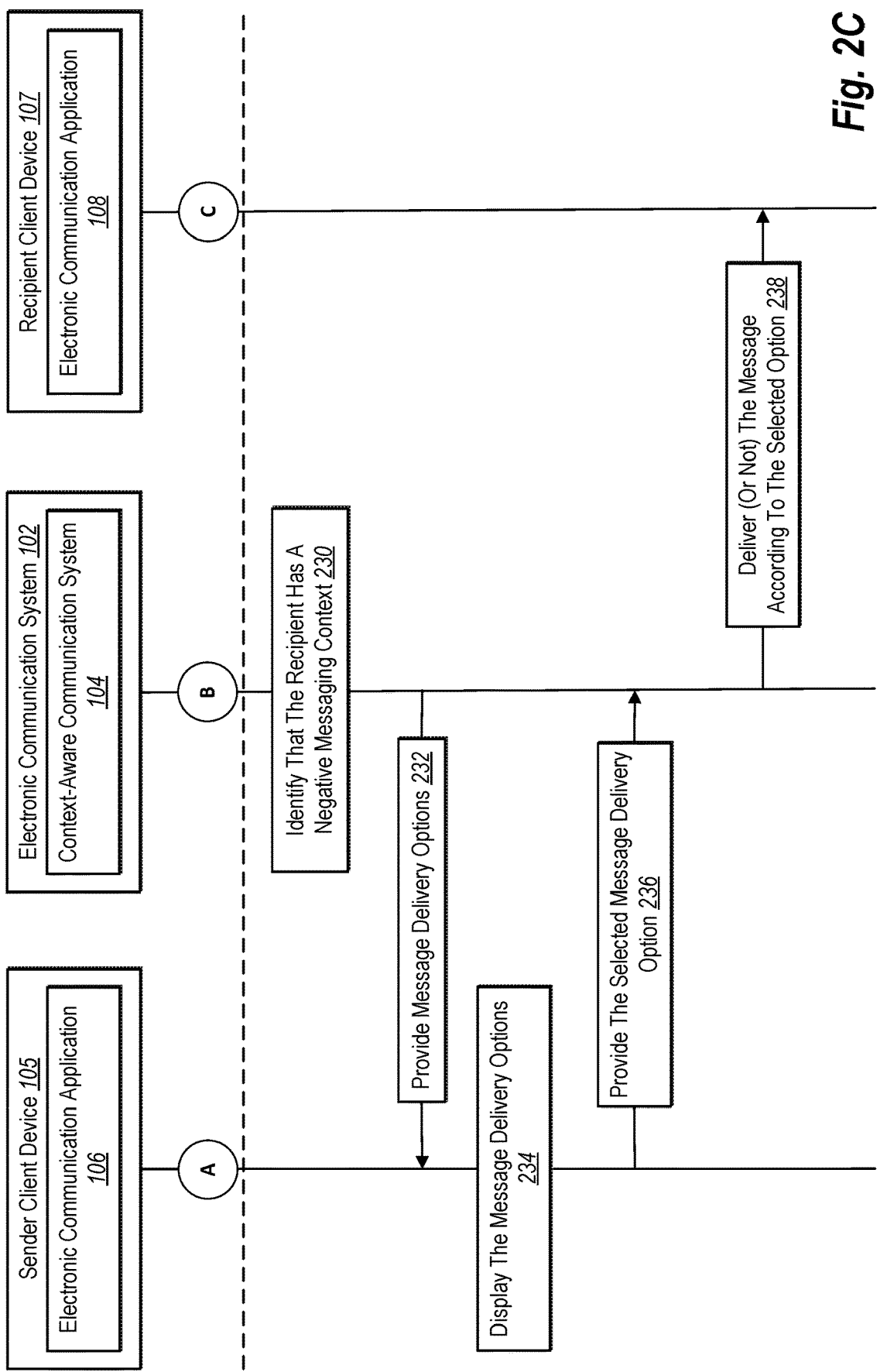

FIGS. 2A-2C illustrate various sequence diagrams of the context-aware communication system 104 performing various acts to provide a communication context of a recipient to a sender. As shown, FIGS. 2A-2C include the electronic communication system 102 hosting the context-aware communication system 104 (e.g., on one or more server device(s) 101), the sender client device 105 including the electronic communication application 106, and the recipient client device 107 including the electronic communication application 108. The electronic communication system 102, the context-aware communication system 104, the sender client device 105, the electronic communication application 106, the recipient client device 107, and the electronic communication application 108 can be the same or similar to those described with respect to FIG. 1.

As mentioned above, FIGS. 2A-2C illustrate various sequence diagrams of a context-aware communication system 104 providing a communication context of a recipient to a sender. FIGS. 2A-2C show three variations, outlined in the next paragraph, of the sender responding to the communication context of the recipient. Note that the dashed line in FIG. 2A corresponds to the dashed line in FIG. 2B and FIG. 2C. In other words, FIG. 2B and FIG. 2C can include the same or similar acts 202-216, included in FIG. 2A above the dashed line.

In FIG. 2A (i.e., acts 202-218), the sender sends a message to the recipient after the sender views a passive indication of the recipient's communication context (e.g., an emoji) that the context-aware communication system 104 provides to the sender client device 105. In FIG. 2B (i.e., acts 202-216 and 220-228), upon receiving the message from the sender client device, the context-aware communication system 104 causes an active indication that the recipient has a negative communication context. The active indication prompts the sender for confirmation to send a message despite the negative communication context indicated in the active. In FIG. 2C, (i.e., acts 202-216 and 230-238), upon receiving the message from the sender, the context-aware communication system 104 provides the sender with various options (e.g., delayed delivery option or notification option) in response to the recipient having a negative messaging context.

As indicated in the above summary, FIG. 2A illustrates the context-aware communication system 104 causing the sender client device to provide the recipient's communication context to the sender during a message composition process. In particular, and as shown in FIG. 2A, the sender client device 105 receives 202 a selection of a message recipient by the sender. For example, the sender client device 105 detects that the sender selects a recipient within the electronic communication application 106. Receiving a selection of a recipient can include the sender client device 105 detecting selection (e.g., detecting a touch gesture, mouse click, etc.) with respect to an identifier associated with the recipient (e.g., a picture, avatar, icon, name, label, group, message thread, link, shortcut, etc.).

Upon the sender client device 105 detecting a selection of a recipient, the sender client device 105 provides 204 the selected recipient to the context-aware communication system 104, as shown in FIG. 2B. In particular, the sender client device 105 sends an identifier of the selected recipient to the context-aware communication system 104. The sender client device 105, in many instances, encodes or otherwise obfuscates the recipient identifier before providing it to the context-aware communication system 104.

As further shown in FIG. 2A, and using the received identity of the selected recipient, the context-aware communication system 104 determines 206 the communication context of the recipient. As defined above, a communication context relates to a determined state, activity, situation, and/or environment of the recipient used to determine whether or not a recipient is willing and/or available to receive a message. A brief list of examples of a communication context of a recipient include the recipient being on vacation, exercising, sleeping, eating dinner, dining out, driving a car, riding on public transportation, or working. Additional examples of a communication context include attending school, an event, a movie, or a party (e.g. with friends or family).

In general, the communication context provides a real-time (or near real-time) situational awareness of a recipient to a sender wanting to send a message to a recipient. As such, the context-aware communication system 104 apprises the sender regarding the recipient's current situation and enables the sender to decide whether sending a message is timely, appropriate, disruptive, and/or interruptive.

Notably, the context-aware communication system 104 provides a sender with the communication context in a variety of ways that can ultimately leave the final decision to send a message up to the sender. In other words, the context-aware communication system 104 provides communication context information to the sender, and then allows a sender to use the sender's judgment on the importance of the message versus the importance of not interrupting the recipient based on the communication context. In this way, the context-aware communication system eliminates the need for a recipient to constantly set status, block messages, and otherwise try to manually control when to receive messages. Further, in real-world situations, there are typically always messages (e.g., an emergency from a family member) that a recipient will want to receive despite almost any communication context. Thus, a recipient can know that a sender may always have the ability to contact the recipient, when the sender deems the message important enough.

The context-aware communication system 104 can provide a communication context to a sender in a variety of forms. For example, in some embodiments, the context aware communication system 104 categorizes and provides a communication context on a scale that ranges between a positive communication context and a negative communication context. For instance, a positive communication context generally indicates to a sender that a recipient is available to receive messages while a negative communication context indicates that the recipient likely does not want to be interrupted or disturbed. For illustrative purposes, an extremely negative communication context has a score of 1 and an extremely positively communication context has a score of 10. Using this scale, in some embodiments, the context-aware communication system 104 can score each communication context between 1 and 10. A communication context with a score of 5 is neutral.

In other embodiments, the context-aware communication system 104 provides the communication context to a sender in a form of a description (e.g., sleeping, eating, watching a movie) and allows the sender to determine if the communication context is positive or negative. Accordingly, in some embodiments, a communication context is more than a positive or negative indication, but rather, a communication context conveys significant information to a sender that enables the sender to user the sender's judgment to determine whether to send a message. Indeed, depending on the circumstances and relationship of the sender, the same communication context for a recipient may encourage a sender to send a message, discourage the sender to send a message, or have no influence on the sender's decision to send a message to the recipient (e.g., a spouse views a communication context as positive while a co-worker views the same communication context as a negative).

In determining the communication context of the recipient particular, the context-aware communication system 104 communicates with the recipient client device 107. For example, the context-aware communication system 104 monitors activity data from the recipient client device and analyzes the activity data to identify behavior characteristics, which the context-aware communication system 104 uses to determine a communication context for the recipient. The various methods, processes, and techniques for determining a recipient's communication context are described below in detail with respect to FIGS. 3A-3D.

Returning to FIG. 2A, upon determining the recipient's communication context, the context-aware communication system 104 identifies 208 a visual element (e.g., an emoji or background theme) for the determined communication context. For example, the determined communication context corresponds to a unique identifier in a table of visual elements. The context-aware communication system 104 looks up one or more visual elements based on the unique identifier within the table. Alternatively, the context-aware communication system 104 uses machine learning, based on training samples, to identify one or more recipient context visual elements. Examples of various visual elements representing a recipient's communication context are shown and described below in FIGS. 4A-4D and 5A-5C.

As FIG. 2A further illustrates, the context-aware communication system 104 provides 210 the selected visual element to the sender client device 105. In one or more embodiments, the context-aware communication system 104 provides the visual element to the sender client device 105. In an alternative embodiment, the context-aware communication system 104 sends a visual element identifier or other data to the sender client device 105 and the sender client device 105 uses the visual element identifier to look up and locally obtain the visual element symbolizing to the recipient's communication context.

Moreover, while acts 202-210 illustrate that the context-aware communication system 104 determines a communication context and sends an indication of the communication context to the sender client device in response to receiving an indication of a selected recipient, the context-ware communication system 104 is no so limited. In particular, in one or more additional embodiments, the context-ware communication system 104 can periodically (e.g., every 1 second, 5 seconds, 10 seconds, 1 minute, 5 minutes, or longer periods of time) provide an indication of one or more recipient's communication context regardless of a sender selecting the one or more recipients. In such an embodiment, upon a sender selecting a recipient, the sender client device simply provides a visual element that corresponds to the last received communication context. In other words, the electronic communication application 106 may maintain and periodically update a data table of communication contexts for one or more recipients associated with the sender, and provide the latest communication context upon a sender selecting a particular recipient.

As briefly mentioned above, regardless of the particular process in which the context-aware communication system provides a communication context for a recipient, the sender client device 105 displays the selected visual element representing the recipient's communication context within the electronic communication application 106. For instance, the electronic communication application 106 overlays the selected visual element (e.g., an emoji) over or adjacent to the recipient's identifier within a communication thread (e.g., message thread) corresponding to the sender and the recipient.

In some embodiments, the sender client device 105 passively displays a visual element, meaning that the function of the messaging application remains the same despite a potentially negative communication context indicated with respect to the recipient. Accordingly, the sender may recognize the visual element, understand that the visual element symbolizes a negative communication context, and refrain from sending a message to the recipient at that time. Further, in other cases, the sender may recognize the emoji, but still choose to send a message to the recipient based on the sender making a judgment that the content of the message is important enough to justify sending the message in light of the communication context.

As part of sending a message, the sender client device 105 receives 214 message input from the sender, as shown in FIG. 2A. For example, the message input may include text, graphics, audio, video, links, or files that the sender desires to send to the recipient. In addition, the sender client device 105 receives a delivery request (e.g., the sender selects "send") from the sender to send the message to the recipient. As further illustrated in FIG. 2A, in response to detecting the selection of a delivery request, for example, the sender client device 105 provides 216 the message to the context-aware communication system 104. As shown in FIG. 2A, the context-aware communication system 104 delivers 218 the message to the recipient client device 107.

Rather, than immediately delivering the message to the recipient client device 107, the context-aware communication system 104 can perform additional acts. These acts are described in connection with FIGS. 2B and 2C. For example, since the sender client device 105 passively presents the communication context, the sender may not recognize the presence of the visual element if, for example, the sender quickly composes and sends a message. In these cases, the sender may unintentionally send an ill-timed message to the recipient when the recipient has a negative communication context.

Accordingly, FIG. 2B illustrates the context-aware communication system 104, in response to receiving a message from the sender client device, identifying that the recipient has a negative communication context and communicating with the sender client device 105 to receive a confirmation of delivery from the sender (e.g., make certain the sender noticed the communication context) before providing the message to the recipient. As noted above, in one or more embodiments, FIG. 2B includes acts 202-216 shown and described with reference to FIG. 2A.

As shown in FIG. 2B, upon receiving the message from the sender client device 105, the context-aware communication system 104 identifies 220 that the recipient has a negative communication context. For example, the recipient is at a movie and likely does not wish to be disturbed while watching the movie. In response to determining that the recipient currently has a negative communication context, the context-aware communication system 104 prompts 222 the sender to verify delivery of the message given the negative communication context, as illustrated in FIG. 2B. In other words, the context-aware communication system 104 sends a verification request to the sender client device 105 to provide to the sender.

Upon receiving the prompt from the context-aware communication system 104, the sender client device 105 provides 224 an active indication (e.g., a notification) of the recipient's negative communication context, as illustrated in FIG. 2B. The active notification causes the sender client device to provide a selectable element that allows a sender to affirm or cancel delivery of the message in view of the recipient's negative communication context. In this manner, the context-aware communication system 104 causes the sender to actively acknowledge that the sender has recognized the recipient's negative communication context and still wishes to send the message. This prevents the sender from sending the message to the recipient without considering or appreciating the recipient's negative communication context. An example of an active notification is shown and described in FIG. 5B below.

As a note, while the act of identifying 220 that the recipient has a negative context occurs on the context-aware communication system 104, one will appreciate that in some embodiments, the act occurs on the sender client device 105. For example, the electronic communication application 106 identifies that the recipient's communication context is negative and prompts the sender to verify, in an active notification, that the sender recognizes the recipient's communication context before the context-aware communication system 104 delivers the message to the recipient.

If the sender confirms the verification request, the context-aware communication system 104 receives 226 the confirmation to deliver the message, as further illustrated in FIG. 2B. In particular, the sender client device 105 receives user input from the sender confirming to send the message, and the sender client device 105 provides the confirmation to the context-aware communication system 104. Upon receiving the confirmation, the context-aware communication system 104 delivers the message to the recipient client device 228, shown in FIG. 2B. Alternatively, if the sender client device 105 receives user input from the sender rejecting delivery of the message, the sender client device 105 sends an indication of the rejection to the context-aware communication system 104, which then deletes the message.

As an alternative to the embodiments provided in FIGS. 2A and 2B, FIG. 2C describes the context-aware communication system 104 providing the sender with various delivery options in response to the recipient having a negative messaging context. In one or more embodiments, FIG. 2C continues after acts 202-216, as mentioned above. For example, upon receiving the message from the sender client device 105, the context-aware communication system 104 identifies 230 that the recipient has a negative communication context, as illustrated in FIG. 2C.

In response to determining that the recipient has a negative communication context, the context-aware communication system 104 provides 232 message delivery options to the sender client device 105. For instance, the context-aware communication system 104 determines one or more options given the recipient communication context and provides the options to the sender client device 105. Similar to the note above, in some embodiments, the acts of identifying 230 a negative communication context and providing 232 message delivery options can occur on the sender client device 105.

Examples of options (e.g., message delivery options) can include, but are not limited to, sending the message immediately, sending the message after time delay, canceling the message, sending the message when the recipient's communication context changes, sending the message when the recipient's communication context is no longer negative, notifying the sender when the recipient's communication context is no longer negative regarding whether to send the message at that time, and sending the message now and delay notifying/disturbing the recipient until a later time.

As shown in FIG. 2C, the sender client device 105 displays 234 the message delivery options to the sender. For instance, the electronic communication application 106 provides an active notification that prompts the sender to select a message delivery option. An example of displaying message delivery options within a graphical user interface is shown and described in greater detail with respect to FIG. 5C.

Upon receiving a selection from the sender, the sender client device 105 provides 236 the selected message delivery option to the context-aware communication system 104, as shown in FIG. 2C. In response, the context-aware communication system 104 delivers 238 (or not) the message according to the selected option. Thus, if the selected message option is to deliver the message, the context-aware communication system 104 immediately delivers the message to the recipient client device 107. If the selected message option is to deliver the message at a later time, the context-aware communication system 104 delays delivery until the appropriate time. If the received selection is to cancel delivery, the context-aware communication system 104 removes (e.g., deletes) the message without delivering the message.

In order to provide meaningful communication contexts, the context-aware communication system monitors various types of user data to generate a communication context for a particular recipient user. FIGS. 3A-3D illustrate example flows of determining a communication context for a recipient based on determining or receiving data representing various behavior characteristics. The context-aware communication system identifies behavior characteristics from activity data received from a recipient's client device or associated with a recipient (e.g. via the social networking system).

As an initial overview, the context-aware communication system monitors, with permission, activity data associated with a recipient. Activity data can include, but is not limited to, a device state (e.g., on, off, in sleep mode, in low power mode, in do-not-disturb mode, on a call, etc.), a device status (battery level, network activity level, device timestamp, etc.), device movement data (e.g., gyroscope data, accelerometer data, etc.), device location data (e.g., GPS positioning, WI-FI network, cell triangulation, etc.), user location data (e.g., check-ins, calendar location data, smart text location data, etc.), device engagement data (e.g., the recipient is running applications, calling another person, playing music or video, providing user input, activating the screen, etc.), device inactivity data (e.g., time since last recipient engagement), biometric data (e.g., steps, heart rate, health charts, etc.), social networking data (e.g., posts, status updates, positive or negative indications, "likes," connections, social activity level, etc.), calendar data, and profile data (e.g., user demographics, relationships, job status, transactional data, ownership data, etc.). In general, activity data includes any raw or structured data provided by a recipient client device or otherwise corresponding to the recipient. In some embodiments, multiple client devices associated with a recipient provide activity data associated with the recipient. Further, in some instances, activity data is provided by a third-party with authorization from the recipient.

In one or more embodiments, the context-aware communication system 104 analyzes the activity data associated with a recipient to identify behavior characteristics. The context-aware communication system identifies numerous behavior characteristics from the received activity data. Some examples of behavior characteristics include location, date and time, movement, device engagement, social data, heart rate, elapsed device inactivity, previous behavior patterns, etc. In some cases, the context-aware communication system analyzes a single piece of activity data to identify a behavior characteristic. In other cases, the context-aware communication system analyzes multiple pieces and/or multiple types of activity data to identify a behavior characteristic.

As one example of identifying a behavior characteristics, the context-aware communication system receives activity data from the recipient's client device of: Time A at GPS Position A, Time B at GPS Position A, and Time C at GPS Position A. As such, the context-aware communication system determines a behavior characteristic for movement as "no movement." Alternatively, if the context-aware communication system receives activity data from the recipient's client device of: Time A at GPS Position A, Time B at GPS Position B, and Time C at GPS Position C, the context-aware communication system determines the behavior characteristic for movement (e.g., "movement at X mph"). Further, the context-aware communication system can determine, based on analyzing at least the received client device location data and/or recipient location the behavior characteristic for the recipient's location as at "home," "work," "school," or "church."

Figure 3A:
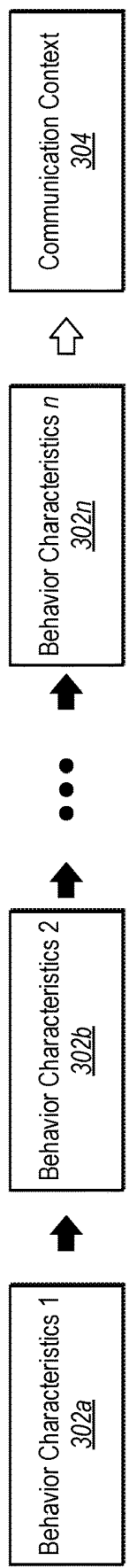
FIGS. 3A-3D illustrate example flows of determining a communication context for a recipient in accordance with one or more embodiments described herein.

Once the context-aware communication system identifies a set of behavior characteristics for a recipient, the context-aware communication system can determine the recipient's communication context. As illustrated in FIG. 3A, the context-aware communication system determines a communication context 304 based on behavior characteristics 302a-n. In particular, the context-aware communication system determines (e.g., identifies, calculates, estimates, infers, scores, ranks, etc.) a communication context based on a plurality of behavior characteristics—often based on two, three, or more behavior characteristics.

As mentioned above, the context-aware communication system may use various methods, processes, and/or techniques to determine a recipient's communication context. For example, in one or more embodiments, the context-aware communication system employs a decision tree to determine a communication context of a recipient. In these embodiments, the context-aware communication system traverses a path within the decision tree to arrive at a communication context. The path taken by the context-aware communication system to arrive at a communication context can depend on the relationship and applicability between behavior characteristics. For instance, a path can include the behavior characteristics of movement, location, and time, but not to include the behavior characteristic of step count or device inactivity.

In some embodiments, the context-aware communication system employs a linear regression to determine a communication context. A simplified example linear regression is shown below.

$$y = \beta_0 + \beta_1 x_1 \beta_2 x_2 + \beta_3 x_3 + \ldots + \beta_n x_n + \varepsilon_1$$

where $\gamma$ is the communication context, $\beta$ is a regression coefficient, x is a behavior characteristic, and $\varepsilon$ is the error term. While a simplified example of a linear regression is provided, one will appreciate that the context-aware communication system can employ other linear regression formulas and equations.

In one or more embodiments, the context-aware communication system employs a rule-based algorithm to determine the communication context of a recipient. For example, the context-aware communication system applies multiple behavior characteristics to the rule-based algorithm to obtain a score for various communication contexts. The context-aware communication system selects one or more of the highest scored communication contexts. Alternatively, the context-aware communication system selects each communication contexts above a threshold confidence value based on the scores. While calculating a score for various communication contexts is described with respect to rule-based algorithms, the context-aware communication system can use communication context scores and threshold confidence values under any of the various methods, processes, and techniques described herein.

In additional or alternative embodiments, the context-aware communication system employs machine learning to determine the communication context of a recipient based on behavior characteristics. For instance, the context-aware communication system trains using a supervised or unsupervised data set. Then, the context-aware communication system applies the behavior characteristics to the machine-learning model to determine a communication context (or communication context scores as described above). One will appreciate that as part of employing machine learning, the context-aware communication system can further employ various algorithms, such as those provided above, logistic regression, k-means, naive Bayes, random forest, multidimensional, and/or other algorithms.

Further, as part of determining the communication context, the context-aware communication system can apply various weights to each behavior characteristic. The weight of the each behavior characteristic can be equal, unequal, or a combination of equal and unequal weights. For example, when the device engagement behavior characteristic indicates that the recipient is currently using their client device, the context-aware communication system heavily weights this behavior characteristic while not weighting, or weighting less, other behavior characteristics.

Figure 3B:
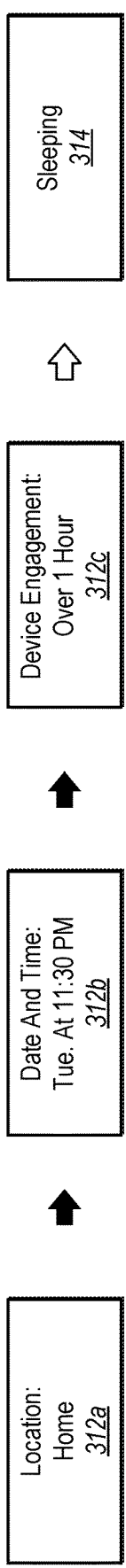
Figure 3C:
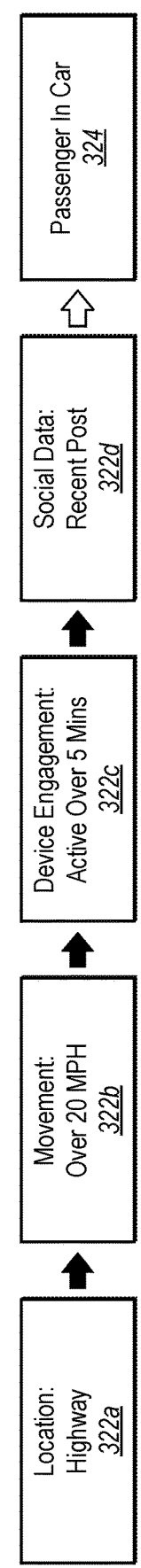
Figure 3D:
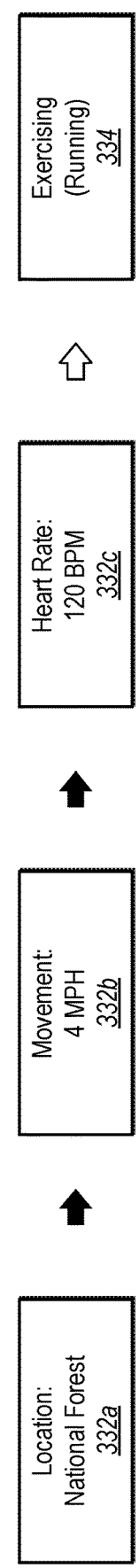

To illustrate, FIGS. 3B-3D illustrate example flows of determining a communication context for a recipient given a set of behavior characteristics. As shown, FIG. 3B includes the behavior characteristics of Location 312a, Date and Time 312b, and Device Inactivity 312c. FIG. 3B also shows the determined communication context 314. In particular, the context-aware communication system applies the values or attributes from the behavior characteristics 312a-c to arrive at the communication context 314. For example, the context-aware communication system applies the values and attributes from recipient's client device of being 11:30 pm, at home, (where the time is provided by the recipient client device based on the recipient's local time zone), a Tuesday, and inactive for over an hour. As such, the context-aware communication system determines that the recipient's communication context is sleeping. As mentioned above, the context-aware communication system can employ one or more methods, processes, and/or techniques to determine the recipient's communication context.

As an alternative example, if the behavior characteristic of Device Inactivity 312c indicates that the recipient recently used the device, the context-aware communication system would likely not determine that the recipient's communication context is sleeping. Further, adding a behavior characteristic of Client Device Movement, which indicates movement (e.g., acceleration or deceleration as provided by the recipient client device's accelerometer), the context-aware communication system will likely determine the recipient's communication context as "still awake" or "on the move." Generally, the context-aware communication system can determine more specific communication contexts as the number of available behavior characteristics increases.

FIG. 3C illustrates the context-aware communication system determining a different communication context for a recipient given a different set of behavior characteristics. In particular, FIG. 3C shows the behavior characteristics of Location 322a, Movement 322b, Device Engagement 322c, and Social Data 322d as well as the determined communication context 324. Accordingly, the context-aware communication system applies the values or attributes from the recipient's client device of being on a highway, traveling over 20 mph, active on the recipient client device for over 5 minutes, and recently posted to social media. Accordingly, the context-aware communication system determines that the recipient is a passenger in a car or bus.

Alternatively, if the behavior characteristics indicated being on a highway, traveling over 20 mph, no device activity, and no social media post, then the context-aware communication system may determine that the user is either driving or a passenger. In this case, the context-aware communication system can calculate a score for each communication context and provide the communication context with the higher score. In addition, when the context-aware communication system determines two or more conflicting communication contexts (e.g., two communication contexts have scores very close to one another), the context-aware communication system may access additional behavior characteristics, such as past behavior, to resolve the potential conflict.

FIG. 3D illustrates the context-aware communication system determining yet a different communication context for a recipient given a different set of behavior characteristics. In particular, FIG. 3D shows the behavior characteristics of Location 332a, Movement 332b, and Heart Rate 332c as well as the determined communication context 334. As shown, the context-aware communication system applies the values or attributes from the recipient's client device of being located in a national forest (e.g., based on GPS coordinates), moving at 4 mph, and having an elevated heart rate of 120 beats per minute to determine the communication context of exercising.

As mentioned above, the context-aware communication system may determine conflicting communication contexts. In other cases, the context-aware communication system determines multiple potential communication contexts from the set of behavior characteristics. For example, in FIG. 3D, the context-aware communication system determines that the recipient is either running or biking. As such, the context-aware communication system identifies the broader label of "exercising" as the communication context. As described above, the context-aware communication system can obtain additional behavior characteristics to narrow the recipient's communication context.

FIGS. 4A-8 provide example embodiments of sender client devices that include graphical user interfaces. As described herein, each graphical user interface is an intelligent interface that dynamically updates as a sender interacts with the sender client device. Generally, the sender client device receives user input and/or other data received from a sender (or source simulating user input) to manage, control, and/or facilitate the use of the graphical user interface. In addition, the sender client device facilitates the presentation (e.g., by way of a display screen) of the graphical user interface for purposes of allowing a sender to access the features and benefits of the context-aware communication system. In many instances, upon the sender client device receiving user input from the sender, the sender client device provides an indication of the user input to the context-aware communication system.

As described above, the context-aware communication system provides a recipient's communication context to a sender (e.g., via a sender client device) that is initiating a message with the recipient. FIGS. 4A-4D illustrate example views of a sender client device 400 having a graphical user interface 402 that displays one or more passive visual elements of a communication context within a communication thread between a sender and a receiver. An electronic communication application running on the sender client device 400 may display the graphical user interface 402. The sender client device 400 shown in FIGS. 4A-4D can be an example embodiment of sender client devices described above.

As shown, FIGS. 4A-4D each illustrate a sender client device 400 having a graphical user interface 402 that includes a communication thread 404 and a communication header 406 (or simply "header 406"). Generally, the communication thread 404 includes a list of previous messages (i.e., electronic communication messages) between the sender and the recipient. Within the communication thread 404, the sender's messages originate from the right, and the recipient's messages originate from the left. The communication header 406 shows the name 408 of the recipient (i.e., "Pablo") along with an image 410 of the recipient.

The graphical user interface 402 in FIGS. 4A-4D also show various examples of visual elements. As shown, the graphical user interface 402 displays one or more visual elements in the communication header 406 as well as one or more visual elements in the communication thread 404. While FIGS. 4A-4D show various embodiments of visual elements, one should appreciate that these embodiments are illustrative and that additional embodiments are within the scope of this disclosure.

Figure 4B:
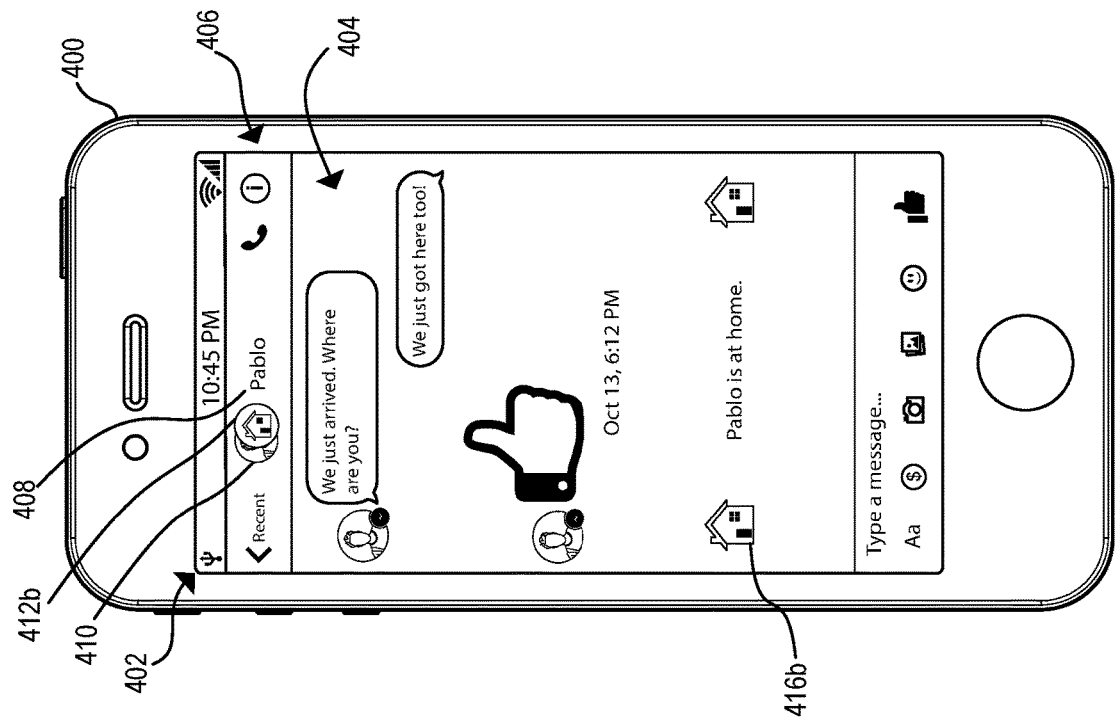
FIGS. 4A-4D illustrate examples of a graphical user interface that provides a sender with one or more passive visual elements corresponding to a communication context in accordance with one or more embodiments described herein.
Figure 4A:
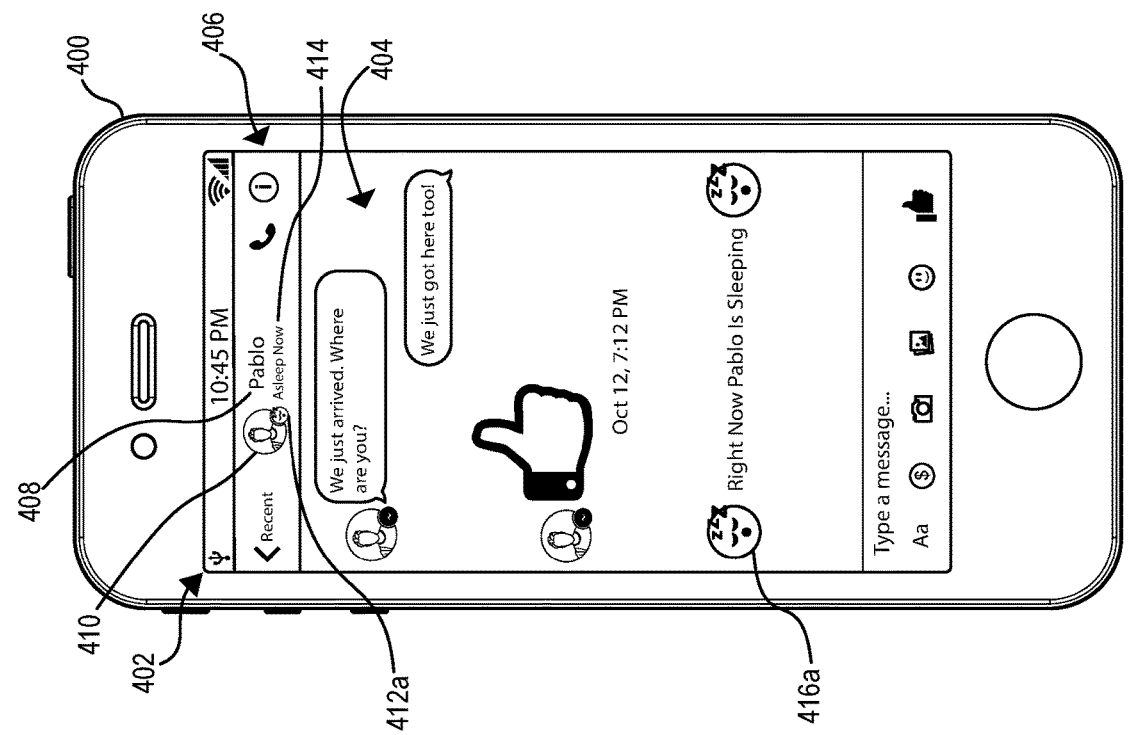

To illustrate, FIG. 4A illustrates multiple visual elements indicating the communication context of the recipient including a header emoji 412a, a text status element 414, and a context thread notification 416a. By way of background, the context-aware communication system provides the sender client device 400 in FIG. 4A with communication context of "sleeping." As described above, the context-aware communication system determines the communication context for the recipient and provides the communication context (or an identifier representing the communication context) of the recipient to the sender client device 400. The sender client device 400, in turn, displays a visual element representing the recipient's communication context to the sender.

In response to receiving an indication that the recipient's communication context is "sleeping," the sender client device 400 displays a sleeping emoji as the header emoji 412a. The sender client device 400 passively overlays the sleeping header emoji 412a over a portion of the recipient's image 410. Accordingly, the sender is made aware that the recipient is sleeping and that sending a message has a high likelihood of disturbing the recipient.

In the embodiment shown in FIG. 4A, the sender client device 400 also provides a text status element 414 within the communication header 406 of the graphical user interface 402. The text status element 414 provides a descriptive indication of the recipient's current communication context. In embodiments where the text status element 414 is not displayed, upon the sender selecting the header emoji 412a, the sender client device 400 can provide the sender with a text description of the recipient's communication context provided by the context-aware communication system.

As also shown, the graphical user interface 402 displays a context thread notification 416a within the communication thread 404. The context thread notification 416a provides an additional (or alternative) passive notification of the recipient's communication context. In FIG. 4A, the context thread notification 416a includes visual elements including both emojis and a text description, each which provide indications of the recipient's communication context.

In the embodiment shown in FIG. 4B, the sender client device 400 also displays a header emoji 412b over the recipient's image 410. In FIG. 4B, the header emoji 412b provides a visual element indicating that the recipient is at home. The header emoji 412b in FIG. 4B is enlarged to provide a better visual indication to the sender regarding the recipient's communication context. One will appreciate that one or more visual elements corresponding to the recipient's communication context can vary in size, shape, and position within the graphical user interface 402.

In addition, FIG. 4B also displays a context thread notification 416b of a visual element that includes emojis of a home and a text description specifying that the recipient is at home. Accordingly, despite the late hour, the header emoji 412b and the context thread notification 416b provide visual elements that indicate to the sender that the recipient is available to receive messages. In some embodiments, rather than displaying the context thread notification 416b within the message thread, the sender client device 400 provides the same notification (e.g., emojis of a home and a text description specifying that the recipient is at home) within a notification window upon receiving a selection of the header emoji 412b from the sender.

Figure 4D:
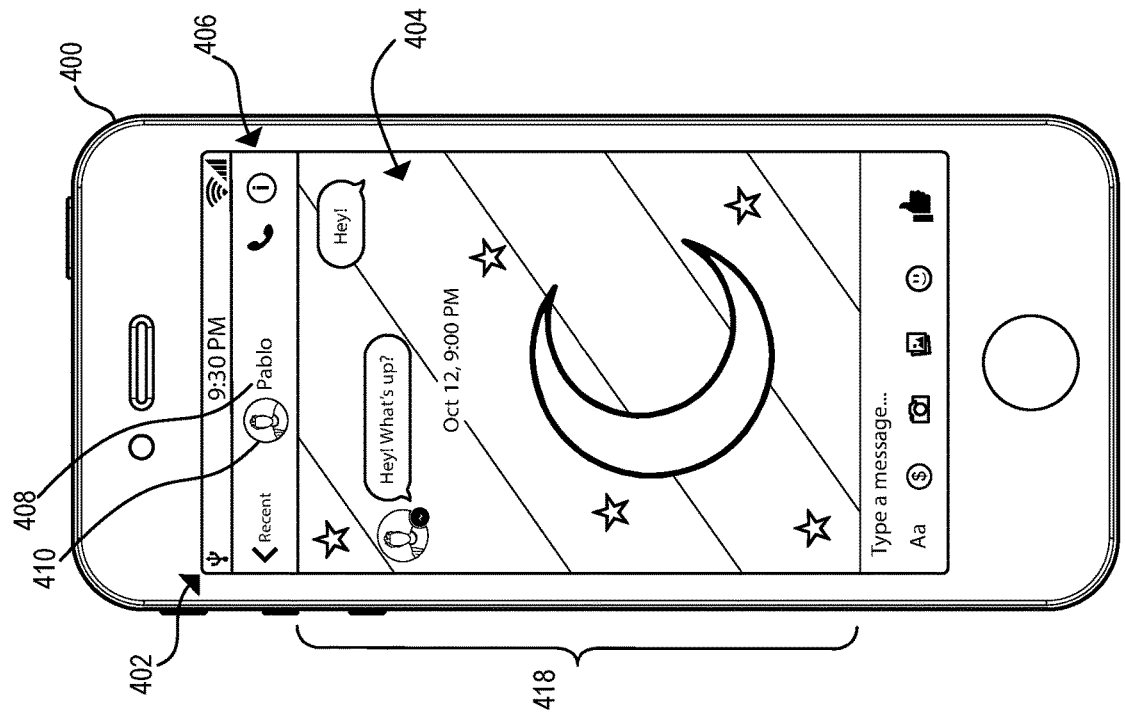
Figure 4C:
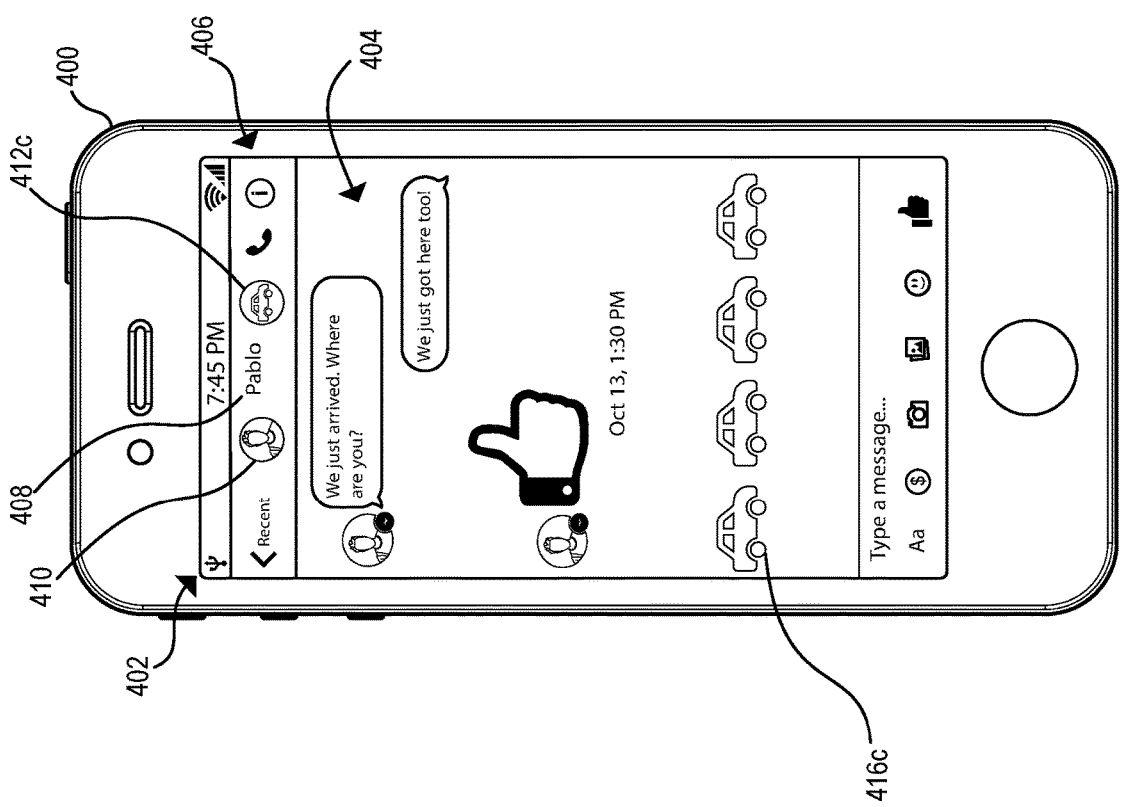

In FIG. 4C, the sender client device 400 displays the header emoji 412c adjacent to the recipient's name 408, rather than displayed over the recipient's image 410. As shown, the header emoji 412c is an emoji of a car, which symbolizes that the recipient is currently in a car or traveling. As mentioned above, upon the sender selecting the header emoji 412c, the sender client device 400 can provide a text description of the recipient's communication context. Seeing that the recipient is in the car, the sender may decide the not send the recipient a message.

FIG. 4C also displays a context thread notification 416c of car emojis. Alternatively, the context thread notification 416c can display an animated visual element (e.g., a gif) of a car driving or moving across the screen. While still passively displayed, an animated visual element may better notify the sender of the recipient's communication context. Additionally, and/or alternatively, the context thread notification 416c can also include a text description above or below the car emojis indicating that the recipient is in a car, driving, riding in a car, traveling, etc.

In some embodiments, the sender client device 400 provides a graphical user interface theme indicating the recipient's communication context. To illustrate, FIG. 4D illustrates the sender client device 400 displaying a context-based theme 418 within the communication thread 404. For example, the context-aware communication system indicates to the sender client device 400 that the recipient's communication context is "late at night" or "sleeping." In response, the sender client device 400 identifies a context-based theme to apply to the communication thread 404. In some embodiments, the sender client device 400 identifies a context-based theme by looking up the received communication context in a database to identify one or more corresponding context-based themes.

As shown, the context-based theme 418 passively displays a moon and stars behind the messages in the communication thread 404. Further, in the illustrated embodiment, the sender client device 400 darkens the communication thread 404 (shown as diagonal lines) as part of the context-based theme 418. The context-based theme 418 provides an indication to the sender that causes the sender to more carefully weigh the importance of sending a message versus the risk of interrupting the recipient.

As described above, the sender client device 400 passively displays visual elements to a sender that indicate the recipient's communication context. In some embodiments, the context-aware communication system instructs a sender client device to provide an active visual element (e.g., a visual notification window) to the sender. Generally, the sender client device can display an active visual element in addition to one or more passive visual elements. However, in some embodiments, the active visual element replaces the passive visual element on a sender client device.

While a sender client device can display an active visual element in connection with any visual element, the context-aware communication system instructs a sender client device to display an active visual element that notifies the sender when the recipient's communication context is negative. Generally, an active visual element causes the sender to acknowledge the recipient's communication context before sending a message. Further, the active visual element provides the sender with an opportunity to cancel delivery of the message so as not to disturb or interrupt the recipient. Such acknowledgment is often unnecessary when the recipient's context is positive, and the recipient is available to receive messages. Accordingly, the context-aware communication system uses active visual elements to ensure that a sender conscientiously chooses to send a message to a recipient despite the recipient's negative communication context.

Figure 5B:
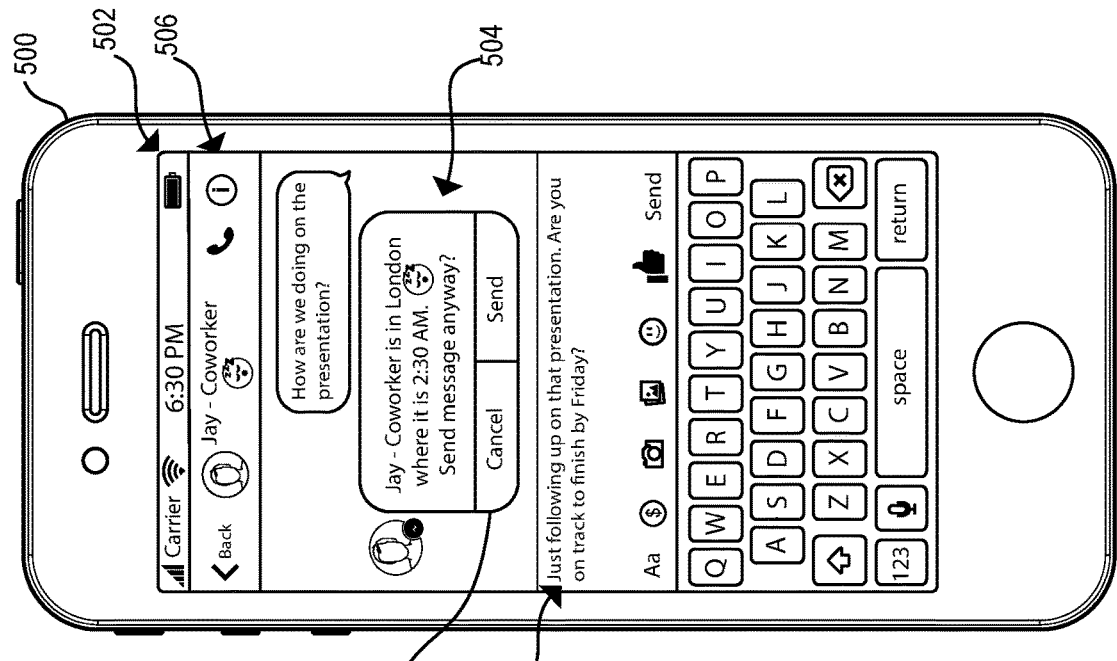
Figure 5A:
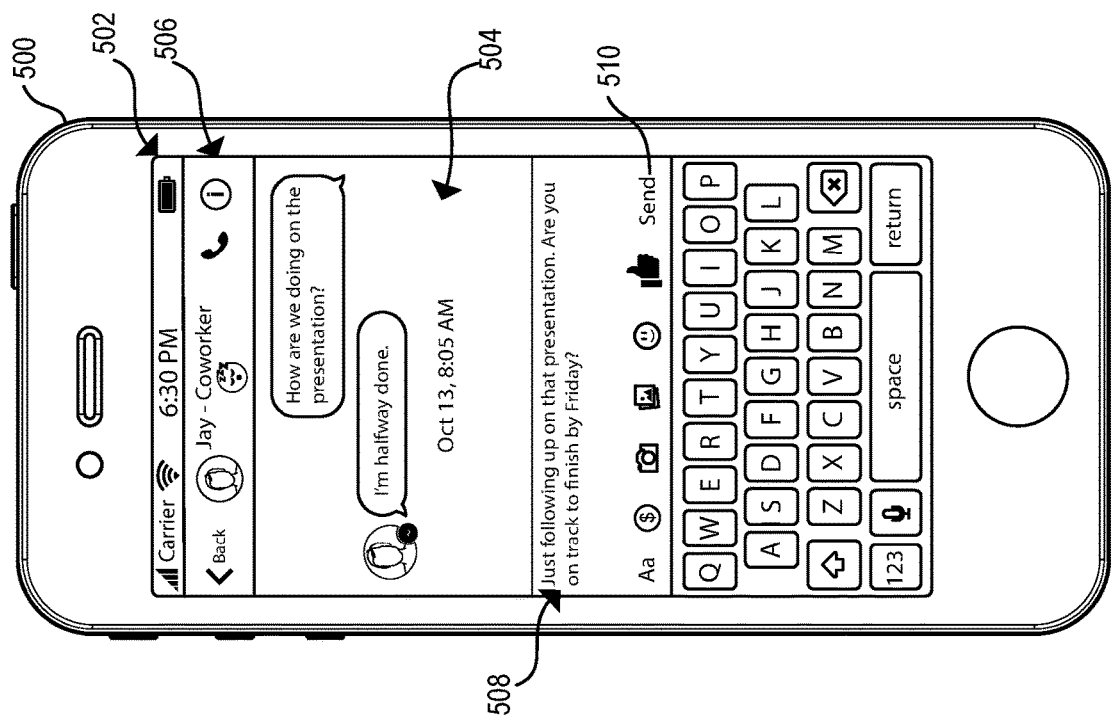

FIGS. 5A-5C illustrate example views of a sender client device 500 having a graphical user interface 502 that displays an active indication that a recipient has a negative communication context. An electronic communication application running on the sender client device 400 may display the graphical user interface 402. The sender client device 500 shown in FIGS. 5A-5C can be an example embodiment of sender client devices described above.

As shown, FIGS. 5A-5C illustrate a sender client device 500 having a graphical user interface 502 that includes a communication thread 504 and a communication header 506. The communication thread 504 includes a list of previous messages between the sender and the recipient. The communication header 506 shows the name of the recipient, an image of the recipient, and passive visual elements indication the recipient's communication context. Additional information regarding the communication header 506 is described above in connection with FIGS. 4A-4D.

As shown in FIG. 5A, the communication header 506 provides a passive indication of the recipient's communication context. In particular, the communication header 506 displays a sleeping emoji showing that the recipient is sleeping. Because the sender client device 500 passively displays the sleeping emoji, the sender may not notice it when sending a message. In another scenario, the sender recognizes the sleeping emoji but dismisses it as incorrect, inaccurate, or unimportant. The sender may not appreciate that the recipient is located in another time zone that is significantly ahead or behind the sender's local time.

Irrespective of whether the sender recognized the sleeping emoji in the communication header 506, the sender desires to send a message to the recipient. For example, the sender client device 500 receives user input (e.g., text) in a text field 508 from the sender to send in a message to the recipient. Further, the sender client device 500 receives a user request to deliver (e.g., via the send button 510) the text to the recipient within a message. Upon the sender selecting the send button 510, the sender client device 500 (and/or context-aware communication system) detects that the recipient has a negative communication context.

In response to receiving the delivery request, the sender client device 500 provides an active visual element to the sender that notifies the sender of the recipient's negative communication context and confirms the sender's intent to send the message. Accordingly, as shown in FIG. 5B, the sender client device 500 provides the active visual element 512 as a notification window. The active visual element 512 in FIG. 5B informs the sender that the recipient's local time is 2:30 AM and that the recipient is sleeping (as opposed to the sender's local time of 6:30 PM). Further, the active visual element 512 causes the sender to acknowledge the recipient's communication context and prompts the user to cancel or confirm delivery of the message. In this manner, the context-aware communication system ensures that a sender makes an informed decision when sending a message to a recipient having a negative communication context.

In some embodiments, the context-aware communication system provides the sender client device 500 with additional delivery options, which the sender client device 500 can present to the sender. For example, FIG. 5C illustrates an active visual element 514 that includes various delivery options 516. In FIG. 5C, a sender has requested delivery of a message to a recipient who is at the movies—a negative communication context for receiving messages.

As with the active visual element 512 in FIG. 5C, the active visual element 514 in FIG. 5C includes the option to immediately send the message or to not send the message. In addition, the active visual element 514 provides additional delivery options 516. In one or more embodiments, the delivery options 516 are tailored to the recipient's communication context (e.g., watching a movie). For example, the sender client device 500 displays a delivery option 516 to send the message upon completion of the movie. Upon receiving an indication that the sender has selected this option, the context-aware communication system holds the message until the recipient's communication context changes, at which time, the context-aware communication system delivers the message. In some embodiments, the context-aware communication system may delay delivery until the recipient's communication context changes to a positive communication context.

Another delivery option 516 shown is to notify the sender when the movie is over. Based on the receiving an indication that the sender has selected this option, the context-aware communication system monitors the recipient's communication context and provides the sender client device with a notification when the recipient's communication context changes. In some cases, the sender is sending time-sensitive information to the recipient, and depending on how long the recipient's communication context takes to change, the information may no longer be accurate or relevant. As such, when the recipient's communication context changes, the context-aware communication system notifies the sender and asks the sender, via the sender client device, whether to deliver, cancel, or edit the message.

As another delivery option 516, in some embodiments, the context-aware communication system provides silent delivery of the message. In these embodiments, the context-aware communication system delivers the message to the recipient having a negative communication context, but delays notifying the recipient of the message. For example, if the recipient is sleeping, the context-aware communication system delivers the message to the recipient but waits for the recipient to wake before sending a notification regarding the message. Stated differently, the context-aware communication system monitors the recipient's communication context and waits for a change from the negative communication context to a positive communication context (e.g., the recipient's awake and checking email/social media) before sending a notification regarding the message. As another example, if the recipient is driving, the context-aware communication system delays notifying the recipient of the message delivery until the recipient has stopped driving. In this manner, the context-aware communication system delivers the message upon the sender's request, but does so in a manner that minimizes interruptions to the recipient.

Figure 6C:
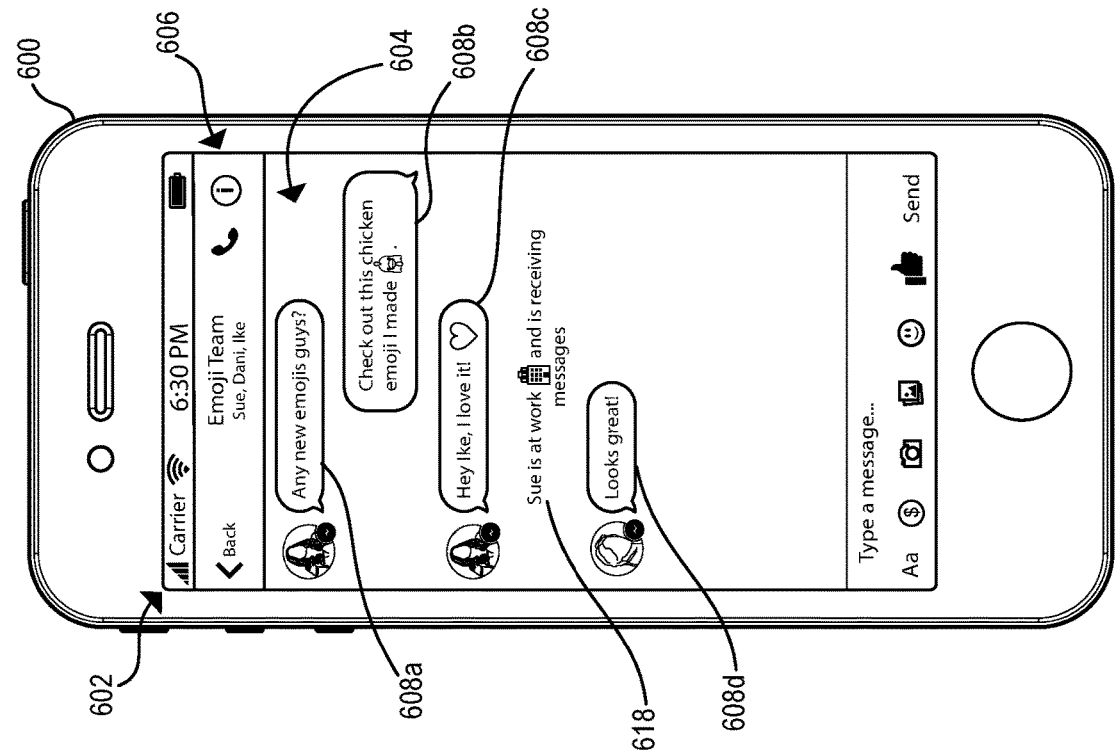
Figure 6B:
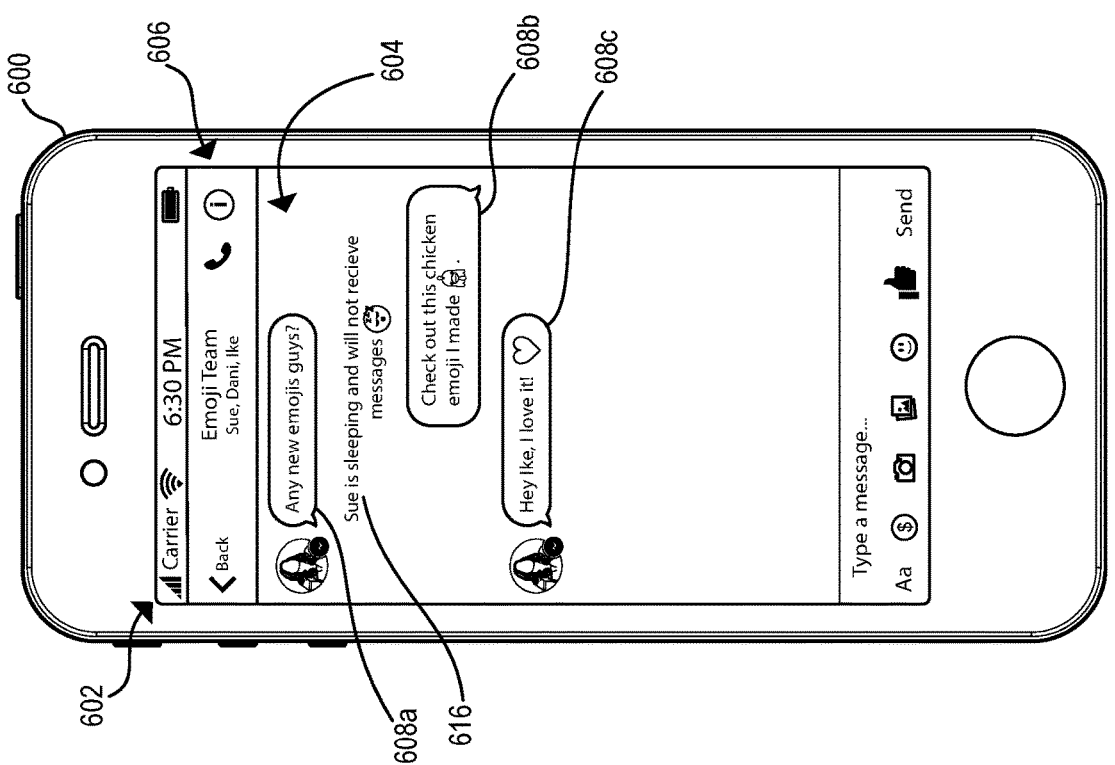

FIGS. 6A-6C illustrate example views of a sender client device 600 having a graphical user interface 602 that displays a communication context for a recipient in a group messaging setting. An electronic communication application running on the sender client device 600 may display the graphical user interface 602. The sender client device 600 shown in FIGS. 6A-6C can be an example embodiment of sender client devices described above.

As shown, FIGS. 6A-6C illustrate a sender client device 600 having a graphical user interface 602 that includes a communication thread 604 and a communication header 606. The communication thread 604 includes a list of previous messages (e.g., electronic communication messages) between the sender and the multiple recipients. The communication header 606 shows the name of the message group (i.e., "Emoji Team") and the users (e.g., the sender and recipients) within the group message thread (e.g., "Sue," "Dani," and "Ike"). For purposes of explication, in FIGS. 6A-6C, the sender client device 600 corresponds to Ike as the sender.

As shown in FIG. 6A, the graphical user interface 602 displays a communication thread 604 that includes a first message 608a from Dani asking the Emoji Team about the creation of new emojis. Also displayed in the communication thread 604 is a context thread notification 616 that provides an indication to members of the group that Sue is sleeping and will not receive the message. Accordingly, when the sender client device 600 receives text input in the text field 610 from Ike to send in a message to the group and provides the message to the context-aware communication system, the context-aware communication system delivers the message to Dani (and Ike), but not Sue.

The context-aware communication system provides, in one or more embodiments, the context thread notification 616 in response to a member of the group selecting an option to delay delivery of electronic messages while Sue has a negative communication context. For example, upon Dani sending the first message 608a, the context-aware communication system, via her client device, determines that Sue has a negative communication context and provides various delivery options to Dani. One of the delivery options is to silence message notifications to Sue while her communication context is negative. As described above, the context-aware communication system can provide additional delivery options. Alternatively, in some embodiments, Sue sets a preference that instructs the context-aware communication system to delay delivery or notifications of group messages while she has a negative communication context.

In FIG. 6B, the context-aware communication system delivers a second message 608b from Ike and a third message 608c from Dani. The context thread notification 616 in FIG. 6B shows that Sue has not received the second message 608b or the third message 608c because of her a negative communication context (e.g., she is sleeping). In some embodiments, a group member can select the context thread notification 616 to receive additional information concerning Sue's communication context. For example, in response to receiving a selection of the context thread notification 616 from Ike, the sender client device 600 provides a notification to Ike indicating that Sue is located in London and has a local time of 2:30 AM.

In an alternative embodiment, the context-aware communication system displays a visual element (e.g., emoji) corresponding to the communication context for each member of the message group. For example, if the number of members in the message group is below a threshold group member number, the context-aware communication system causes the sender client device 600 to display a visual element adjacent to each group member's name indication the communication context of each group member. In another example, the sender client device 600 displays each group member's communication context in a visual element next to messages from that member within the group communication thread (e.g., overlay an emoji next to the member's image within the group communication thread).

Additionally, and/or alternatively, the context-aware communication system causes the sender client device 600 to display one or more visual elements in the message header (e.g., next to the group name). Then, upon selection of the visual element(s), the sender client device 600 provides a list of each group member along with a visual element corresponding to their communication context.

If the number of group members is above the threshold group member number, in some embodiments, the sender client device, the sender client device 600 displays visual elements corresponding to group members having negative communication contexts. For example, the sender client device 600 identifies the most negative one, two, or three communication contexts from among the group members and displays corresponding visual element(s) in the communication header of the group message. As such, the visual element(s) indicate to the sender that at least one group member has a negative communication context. In addition, as described above, upon selection of the visual element(s) or group name by the sender, the sender client device 600 can provide a list of each group member along with the visual element corresponding to their communication context. Further, the sender client device 600 can sort list of group members from negative to positive, or according to another sort order.

Turing now to FIG. 6C, the graphical user interface 602 displays an updated context thread notification 618 indicating that Sue no longer has a negative communication context. Further, because Sue has read the second message 608b and the third message 608c, the context-aware communication system removes the previous context thread notification 616 from the message thread. FIG. 6C also includes a fourth message 608d from Sue commenting on the previous messages.

While FIG. 6C illustrates one example of an updated context thread notification 618, other versions of the updated context thread notification 618 are possible. For example, an update context thread notification includes a date and time of when the context-aware communication system updated the context thread notification 616. Alternatively, in some embodiments, upon Sue's communication context changing, the context-aware communication system removes the context thread notification 616 without displaying an updated context thread notification.

Figure 7:
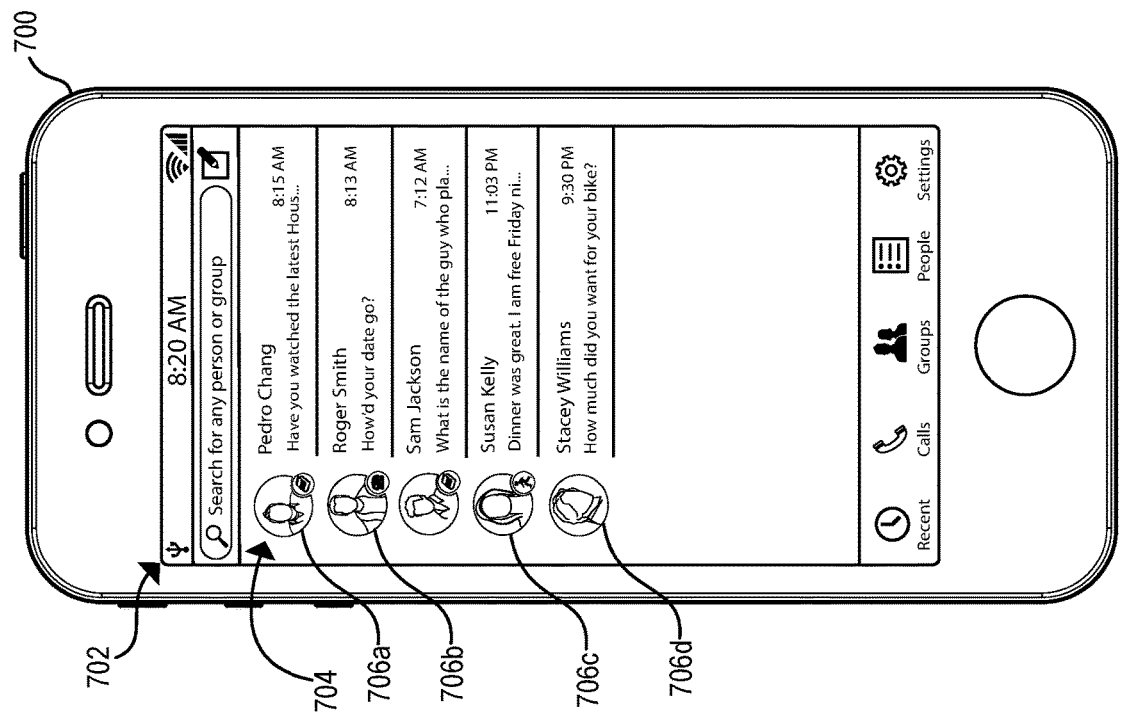
FIG. 7 illustrates an example graphical user interface that provides a list of communication threads having a visual element indicating a recipient's communication context in accordance with one or more embodiments described herein.

FIG. 7 illustrates a sender client device 700 having a graphical user interface 702 that displays a list of communication threads 704 including communication contexts indications for recipients in the list (if available). An electronic communication application running on the sender client device 700 may display the graphical user interface 702. The sender client device 700 shown in FIG. 7 can be an example embodiment of sender client devices described above.

As shown in FIG. 7, the graphical user interface 702 displays the list of communication threads 704. For example, the sender client device 700 displays the list of communication threads 704 as part of a sender's inbox within the electronic communication application. In general, each communication thread in the list of communication threads 704 corresponds to a conversation between the sender and one or more recipients. Accordingly, each communication thread in the list of communication threads 704 includes one or more messages (e.g., electronic message messages).

The list of communication threads 704 also displays an image of each recipient adjacent their communication thread. As also shown, the sender client device 700 overlays a corresponding context emoji over a portion of each recipient's image to indicate the recipient's communication context. To illustrate, the first communication thread 706a displays a book emoji over a portion of Pedro Chang's image indicating to the sender that Pedro is in school. The second communication thread 70b displays a hamburger emoji over a portion of Roger Smith's image indicating that Roger is eating. The fourth communication thread 706c displays a running emoji indicating that Susan is running or exercising. While the sender client device 700 displays the context emojis as small images, one will appreciate that the sender client device 700 can display the context in various sizes and locations, as described above.

The last communication thread 706d, however, does not include a context-based emoji. In some instances, the context-aware communication system cannot determine a communication context for a recipient. Alternatively, the recipient has specified a preference to not share their communication context with one or more other users of the electronic communication system. Context sharing preferences are described below in connection with FIG. 8. In some embodiments, rather than not displaying a context-based emoji, the context-aware communication system causes the sender client device 700 to display a generic graphic corresponding the electronic communication system, as shown in the last communication thread 706d.

In addition to displaying each recipient's communication context in connection with their respective communication thread, a sender client device can also provide an indication of positive or negative communication contexts. For example, based on the fourth communication thread 706c being a negative communication context, the sender client device 700 colors/outlines the running emoji red. Additionally, and/or alternatively, the sender client device 700 can outline the image of Susan with a bold red line. Further, the sender client device 700 may change Susan's name to red. Similarly, based on the second communication thread 706b being a positive communication context, the sender client device 700 modifies the color of the hamburger emoji, image, and/or name. One will appreciate that the sender client device 700 can employ other colors, symbols, or graphics to indicate types of communication contexts corresponding to a recipient.

In one or more embodiments, and as described above, the sender client device 700 provides additional information concerning a recipient's communication context. For example, upon a sender selecting a communication thread, the sender client device 700 updates the graphical user interface 702 to display a communication thread and/or communication header between the sender and recipient. As described above in connection with FIGS. 4A-4D, a sender client device can provide numerous indications of the recipient's communication context within the communication thread and communication header.

Figure 8:
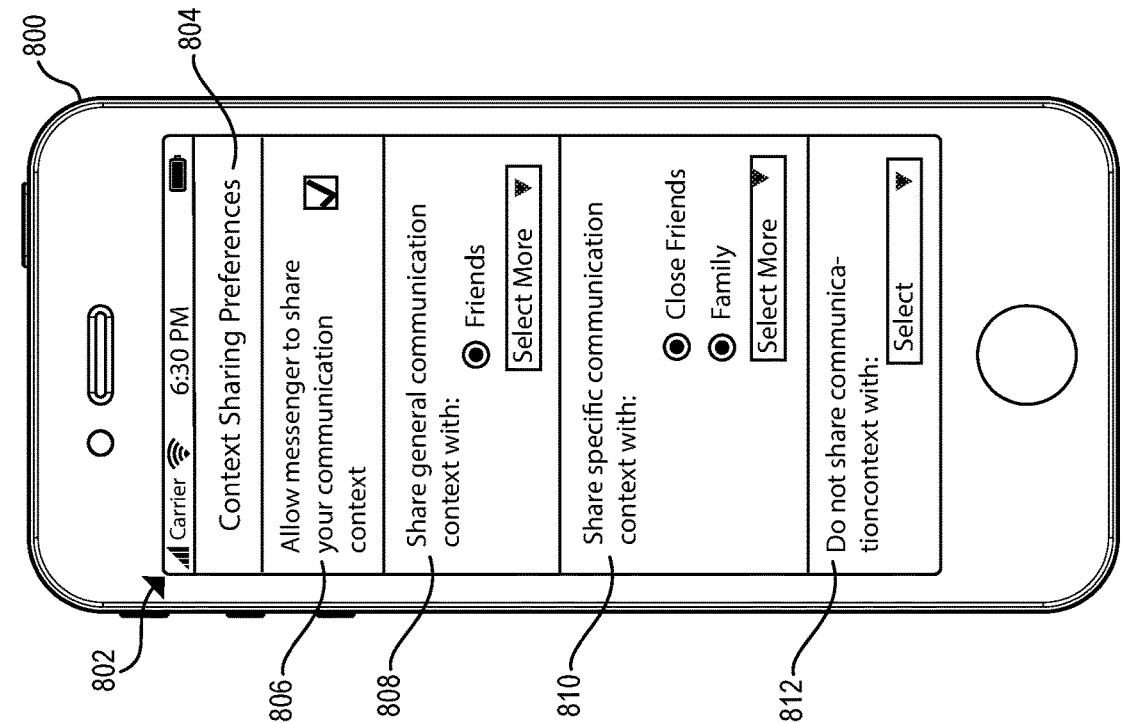
FIG. 8 illustrates an example graphical user interface that provides communication context sharing preferences in accordance with one or more embodiments described herein.

As mentioned above, FIG. 8 illustrates example context sharing preferences. In particular, FIG. 8 illustrates an example sender client device 800 having a graphical user interface that displays communication context sharing preferences 804. An electronic communication application running on the sender client device 800 may display the graphical user interface 802 and provide the context sharing preferences 804. The sender client device 800 shown can be an example embodiment of sender client devices described above.

Due to the nature of sharing, a recipient may not desire to share their communication context with other users of the electronic communication system. Additionally, and/or alternatively, a recipient may choose to be selective regarding which users receive their communication context and the level of specificity provided to these users. As such, in one or more embodiments, the context-aware communication system provides a number of sharing options to a recipient. In addition, in some embodiments, the context-aware communication system imports one or more sharing options from a social networking system or other application.

As shown in FIG. 8 the context sharing preferences 804 provide various communication context sharing options including a global context sharing option 806, a general context sharing option 808, a specific context sharing option 810, and a context exclusion option 812. In one or more embodiments, the context-aware communication system locally stores and retrieves (i.e., access) a recipient's communication context sharing options such that the context-aware communication system can quickly implement the recipient's sharing preferences when sharing the recipient's communication context.

The global sharing option 806 enables a recipient to opt-in or opt-out of providing their communication context to other users. For example, upon the sender client device 800 providing an indication that the recipient selects the global context sharing option 806, the context-aware communication system monitors the activity data from the recipient client device, identifies behavior characteristics, and determines communication contexts for the recipient. Alternatively, upon the sender client device 800 providing an indication that the recipient deselects the global context sharing option 806, the context-aware communication system does not determine the recipient's communication context nor provide it to other users of the electronic communication system.

The general context sharing option 808 enables the recipient to specify users that receive high-level, broad, general updates of the recipient's communication context. As part of the general context sharing option 808, the sender client device 800 receives a selection on a list of users or groups of users whom the recipient is willing to share their general communication context, which the sender client device 800 provides to the context-aware communication system. In turn, the context-aware communication system applies this preference when sharing the recipient's communication context with senders listed in the general context sharing option 808. Examples of a general communication context include the recipient being at home, at work, with company, at an event. Additional examples include eating out, exercising, sleeping, or driving. A general communication context can be positive, negative, or neutral. Further, a general communication context provides a sender with an imprecise, but informative, communication context of the recipient.

Similarly, the specific context sharing option 810 provides the context-aware communication system with a list of users or groups of recipients whom the recipient is willing to share their specific communication context. Specific communication contexts provide more detailed communication contexts of the recipient. Examples of a specific communication context include an indication that the recipient is using their client device or performing a specific activity. Additional examples include an indication that the recipient is at a particular location or event or with specific people (so long as each person has included the sender under their specific context sharing option). A specific communication context can also include an amount of times since the context last changed.

The context exclusion option 812 provides the context-aware communication system with a list of users or groups of recipients whom the recipient is not willing to share their specific communication context. Stated differently, the recipient uses the context exclusion option 812 to block particular users or groups of recipients from receiving their communication context. In some embodiments, the context exclusion option 812 provides an expiration period where one or more users are temporarily blocked. Alternatively, the context exclusion option 812 provides selectable options that cause the context-aware communication system to display the recipient's negative communication context to one or more users without displaying positive or neutral communication contexts.

The context-aware communication system can use the various user-defined context sharing options for the recipient when providing a sender with the recipient's communication context. For example, the context-aware communication system determines that one context is negative for users listed in the general context sharing option 808 but not negative for users listed in the specific context sharing option 810. For instance, the recipient does not perceive receiving electronic messages from users listed in the specific context sharing option 810 (e.g., spouse, family, close friends, etc.) as interruptive when the recipient is eating out or with friends, but does perceive receiving messages from users listed in the general context sharing option 808 as interruptive when eating out or with other company.

As another example, in some embodiments, the context-aware communication system determines which types of visual elements to provide a sender based on the recipient's context sharing options. For example, when the recipient has a negative communication context, the context-aware communication system causes a sender client device to display both a passive (e.g., emoji and/or context-based notification) and active visual element (e.g., notification window) before delivering a message to the recipient. For recipients listed in the specific context sharing option 810, the context-aware communication system causes the sender client device to display a passive visual element without displaying the active visual element.

Figure 9:
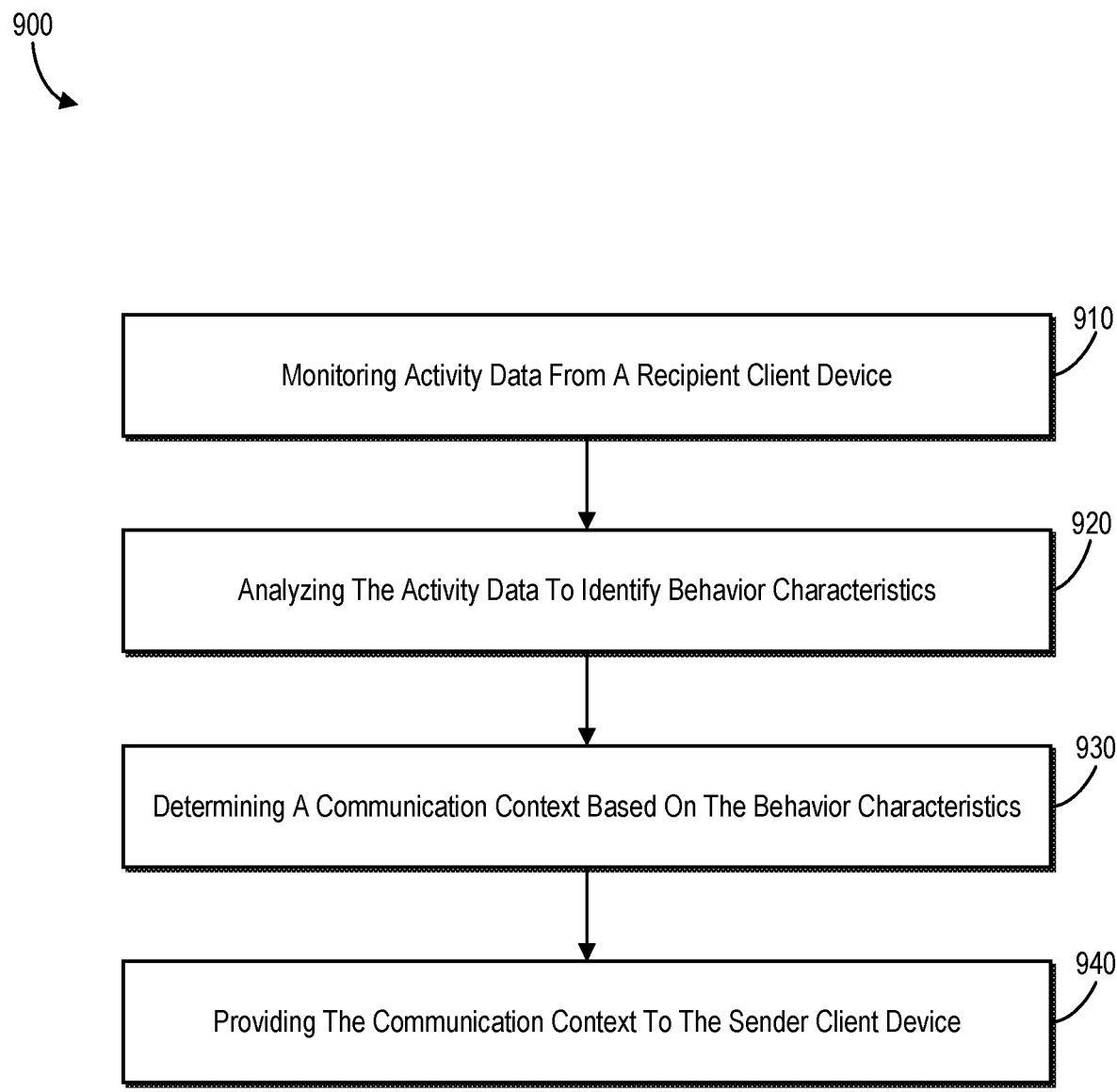
FIG. 9 illustrates a flowchart of a method for providing, to a sender user, a communication context of a recipient user in accordance with one or more embodiments described herein.

FIG. 9 illustrates a flowchart of a method 900 for providing a visual element corresponding to a recipient's communication context to a sending user. In one or more embodiments, the context-aware communication system 104 described herein performs the method 900. For example, a context-aware communication system 104 within an electronic communication system 102, and operating on the one or more server device(s) 101, performs the method 900. Alternatively, the context-aware communication system 104 performs the method 900 in connection with one or more client devices.

The method 900 includes an act 910 of monitoring activity data from a recipient client device 107. In particular, the act 910 may involve monitoring activity data received from a recipient client device associated with a recipient user. In one or more embodiments, the act 910 includes a client device state, a client device status, client device time data, client device movement data, client device location data, user location data, device engagement data, client device inactivity data, biometric data, social networking data, calendar data, and/or profile data.

The method 900 also includes an act 920 of analyzing the activity data to identify behavior characteristics. In particular, the act 920 involves analyzing the activity data to identify a plurality of behavior characteristics. In one or more embodiments, the plurality of behavior characteristics includes a location of the recipient client device, movement of the recipient client device, a time zone of the recipient client device, social media data associated with the recipient user, current biometric data of the recipient user, behavioral patterns of the recipient user, and/or device engagement of the recipient client device.

In addition, the method 900 includes an act 930 of determining a communication context based on the behavior characteristics. In particular, the act 930 involves determining a communication context based on the behavior characteristics. In one or more embodiments, the act 930 includes determining a communication context based on two, three, or more behavior characteristics. In addition, in some embodiments, the act 930 includes predicting, based on the two, three, or more of the plurality of behavior characteristics that the recipient user does not want to be interrupted. In some instances, the recipient user does not want to be interrupted when they are sleeping, driving, eating, or exercising. Further, in some embodiments, the act 930 includes assigning, based on predicting that the recipient user does not want to be interrupted, a negative communication context to the recipient user.

Act 930 can involve receiving, from a sender client device 105 associated with a sender user, an indication that the sender user initiated an electronic communication with the recipient user. In one or more embodiments, the act 930 of receiving the indication that the sender user initiated an electronic communication with the recipient user includes receiving an identifier of the recipient user from the sender client device. In some embodiments, the recipient identifier is received from the sender client device when the sender user opens a communication thread associated with the recipient user within an electronic communication application on the sender client device.

The method 900 also includes an act 940 of providing the communication context to the sender client device and causing the sender client device to display a corresponding visual element. In particular, the act 940 involves providing, based on the received indication, the communication context to the sender client device to cause the sender client device to display a visual element corresponding to the communication context of the recipient user. In one or more embodiments, the visual element is an emoji that corresponds to the communication context of the recipient user. Further, in some embodiments, the act 950 includes causes the sender client device to display the emoji over an icon of the recipient user within an electronic communication application.

Also, as part of the act 950, the visual element can be a graphical user interface theme that represents the communication context of the recipient user. In this case, providing the communication context to the sender client device causes the sender client device to display the graphical user interface theme within an electronic communication thread between the sender user and the recipient user within an electronic communication application. Additionally, and/or alternatively, as part of the act, the visual element can be a text description that corresponds to the communication context of the recipient user.

The method 900 can also include one or more additional acts. For example, the method 900 includes the act of accessing privacy preferences set by the recipient user with respect to the sender user, where providing the communication context of the recipient user to the sender client device is further based on the privacy preferences.

As another example, the method 900 includes the acts of receiving, from the sender client device, an electronic communication delivery request to deliver the electronic communication to the recipient user; determining, in response to receiving the electronic communication delivery request, that the communication context of the recipient user is a negative communication context; and providing, to the sender client device, a confirmation request to deliver the electronic communication to the recipient user based on the communication context of the recipient user being a negative communication context, where the confirmation request causes the sender user to acknowledge the negative communication context prior to accepting the confirmation request. In some embodiments, providing the confirmation request to the sender client device causes the sender client device to display one or more selectable delivery options on the sender client device.

Further, in some embodiments, the method 900 also includes the acts of receiving, from the sender client device, an acceptance of the delivery option of the confirmation request, and providing, in response to receiving the acceptance of the delivery option of the confirmation request, the electronic communication to the recipient client device. Alternatively, the method 900 includes receiving, from the sender device, a rejection of the delivery option of the confirmation request, and canceling, in response to receiving the rejection of the delivery option of the confirmation request, delivery of the electronic communication to the recipient client device.

In other embodiments, the method 900 includes receiving, from the sender device, a postponement of the delivery option of the confirmation request; delaying, in response to receiving the postponement of the delivery option of the confirmation request, delivery of the electronic communication to the recipient client device; detecting or determining a change in the communication context of the recipient user to a positive communication context; and providing, in response to detecting or determining the positive communication context, the electronic communication to the recipient client device. Further, in additional embodiments, providing the confirmation request to the sender client device causes the sender client device to display a pop-up notification indicating the negative communication context.

Figure 10:
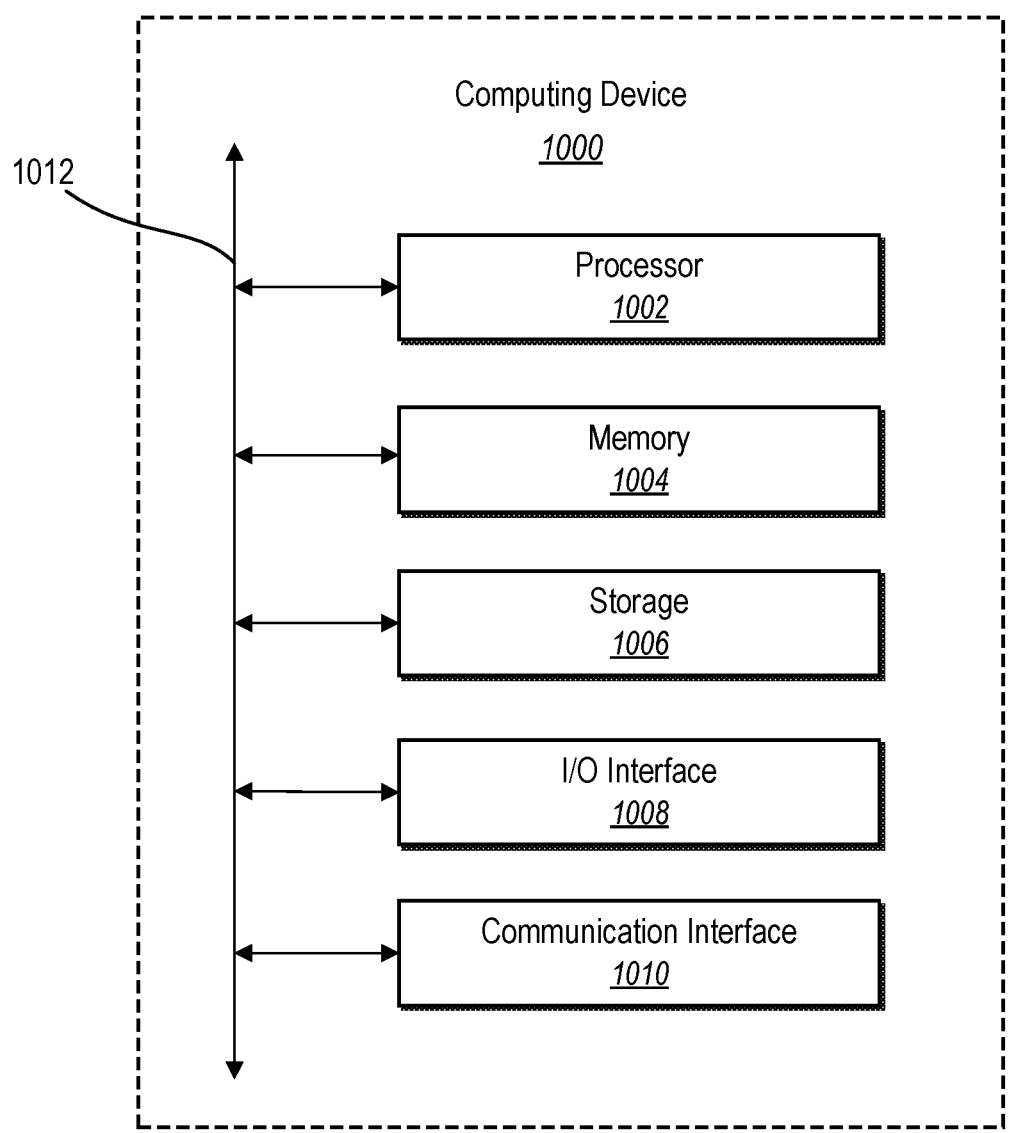
FIG. 10 illustrates a block diagram of a computing device in accordance with one or more embodiments described herein.

FIG. 10 illustrates a block diagram of exemplary computing device 1000 that may be configured to perform one or more of the processes described above. One will appreciate that the computing device 1000 may represent one or more client devices or server devices or, such as those described previously. Further, the computing device 1000 may represent various types of computing devices. For example, the computing device 1000 can include: a mobile device such as a mobile telephone, a smartphone, a PDA, a tablet, a laptop; a non-mobile device such as a desktop or server; or any other type of computing device.

As shown by FIG. 10, the computing device 1000 can comprise a processor 1002, a memory 1004, a storage device 1006, an input/output ("I/O") interface 1008, and a communication interface 1010, which may be communicatively coupled by way of a communication infrastructure 1012. While an exemplary computing device 1000 is shown in FIG. 10, the components illustrated in FIG. 10 are not intended to be limiting. Additional or alternative components may be used in other embodiments. Furthermore, in certain embodiments, the computing device 1000 can include fewer components than those shown in FIG. 10.

In one or more embodiments, the processor 1002 includes hardware for executing instructions, such as those making up a computer program. The memory 1004 may be used for storing data, metadata, and programs for execution by the processor(s). The storage device 1006 includes storage for storing data or instructions.

The I/O interface 1008 allows a user to provide input to, receive output from, and otherwise transfer data to and receive data from computing device 1000. The I/O interface 1008 may include a mouse, a keypad or a keyboard, a touchscreen, a camera, an optical scanner, network interface, modem, other known I/O devices or a combination of such I/O interfaces. The I/O interface 1008 may also include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example, the communication interface 1010 may include a network interface controller (NIC) or network adapter for communicating with an Ethernet or other wire-based network or a wireless NIC (WNIC) or wireless adapter for communicating with a wireless network, such as a WI-FI. The communication infrastructure 1012 may include hardware, software, or both that couples components of the computing device 1000 to each other. As an example, the communication infrastructure 1012 may include one or more types of buses.

As mentioned above, embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor receives instructions, from a non-transitory computer-readable medium, (e.g., memory, etc.), and executes those instructions, thereby performing one or more processes, including one or more of the processes described herein.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Computer-executable instructions comprise, for example, instructions and data which, when executed by a processor, cause a general-purpose computer, a special-purpose computer, or a special-purpose processing device to perform a certain function or group of functions. In some embodiments, a general-purpose computer executes computer-executable instructions, which turns the general-purpose computer into a special-purpose computer implementing elements of the disclosure.

Those skilled in the art will appreciate that the disclosure may be practiced in network computing environments with many types of computer system configurations. The disclosure may also be practiced in distributed system environments where local and remote computer systems, which are linked through a network, both perform tasks. Embodiments of the present disclosure can also be implemented in cloud computing environments. In this description, "cloud computing" is defined as a model for enabling on-demand network access to a shared pool of configurable computing resources.

As mentioned above, the context-aware communication system can be included in a social networking system. A social networking system may enable its users (such as persons or organizations) to interact with the system and with each other. The social networking system may, with input from a user, create and store in the social networking system a user profile associated with the user. As described above, the user profile may include demographic information, communication channel information, and information on personal interests of the user.

In more detail, user profile information may include, for example, biographic information, demographic information, behavioral information, the social information, or other types of descriptive information, such as work experience, educational history, hobbies or preferences, interests, affinities, or location. Interest information may include interests related to one or more categories, which may be general or specific. As an example, if a user "likes" an article about a brand of shoes, the category may be the brand.

The social networking system may also, with input from a user, create and store a record of relationships of the user with other users of the social networking system, as well as provide services (e.g. wall posts, photo-sharing, online calendars and event organization, messaging, games, or advertisements) to facilitate social interaction between or among users. Also, the social networking system may allow users to post photographs and other multimedia content items to a user's profile page (typically known as "wall posts" or "timeline posts") or in a photo album, both of which may be accessible to other users of the social networking system depending on the user's configured privacy settings. Herein, the term "friend" may refer to any other user of the social networking system with which a user has formed a connection, association, or relationship via the social networking system.

Figure 11:
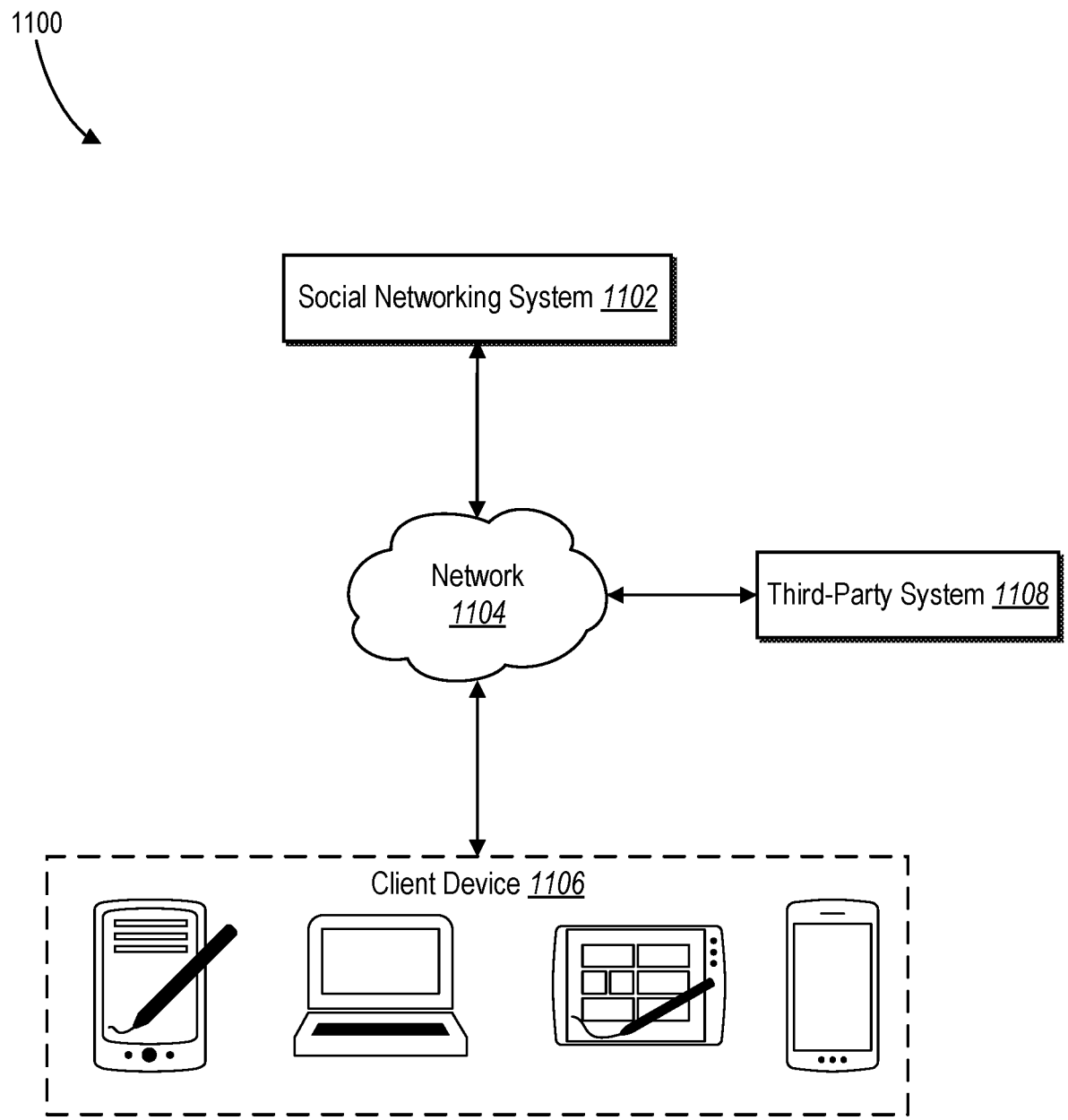
FIG. 11 illustrates a network environment of a social networking system in accordance with one or more embodiments described herein.

FIG. 11 illustrates an example network environment 1100 of a social networking system. The network environment 1100 includes a client device 1106, a social networking system 1102, and a third-party system 1108 connected to each other by a network 1104. Although FIG. 11 illustrates a particular arrangement of client device 1106, the social networking system 1102, the third-party system 1108, and the network 1104, this disclosure contemplates any suitable arrangement and number of client device 1106, the social networking system 1102, the third-party system 1108, and the network 1104.

Links may connect the client device 1106, the social networking system 1102, and the third-party system 1108 to the network 1104 or to each other. Links need not necessarily be the same throughout network environment 1100. One or more first links may differ in one or more respects from one or more second links.

In some embodiments, the client device 1106 may be an electronic device including hardware, software, or embedded logic components or a combination of two or more such components and capable of carrying out the appropriate functionalities implemented or supported by the client device 1106. As an example, a client device 1106 may include any of the computing devices discussed above in relation to FIG. 10. The client device 1106 may enable a network user at the client device 1106 to access the network 1104. The client device 1106 may enable its user to communicate with other users at other client devices or systems.

In some embodiments, the client device 1106 may include a web browser, such as and may have one or more add-ons, plug-ins, or other extensions. The client device 1106 may render a webpage based on the HTML files from the server for presentation to the user.

In some embodiments, the social networking system 1102 may be a network-addressable computing system that can host an online social network. The social networking system 1102 may generate, store, receive, and send social-networking data, such as, for example, user-profile data, concept-profile data, the social-graph information, or other suitable data related to the online social network. The social networking system 1102 may be accessed by the other components of the network environment 1100 either directly or via the network 1104.

In some embodiments, the social networking system 1102 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, etc., or any combination thereof.

In some embodiments, the social networking system 1102 may include one or more data stores. Data stores may be used to store various types of information. In some embodiments, the information stored in data stores may be organized according to specific data structures. Particular embodiments may provide interfaces that enable the client device 1106, the social networking system 1102, or the third-party system 1108 to manage, retrieve, modify, add, or delete, the information stored in data stores.

In some embodiments, the social networking system 1102 may store one or more social graph, described below. In one or more embodiments, the social networking system 1102 may provide users with the ability to take actions on various types of items or objects, supported by social networking system 1102. As an example, the items and objects may include groups or social networks to which users of the social networking system 1102 may belong, events or calendar entries in which a user might be interested, computer-based applications that a user may use, transactions that allow users to buy or sell items via the customer service, interactions with advertisements that a user may perform, etc. A user may also interact with anything that is capable of being represented in the social networking system 1102 or by an external system of the third-party system 1108, which is separate from the social networking system 1102 and coupled to the social networking system 1102 via the network 1104.

The social networking system 1102 can include a variety of stores, modules, and/or managers as described below. In one or more embodiments, a connection manager may be used for storing connection information about users. The connection information may indicate users who have similar or common work experience, group memberships, hobbies, educational history, or are in any way related or share common attributes. The connection information may also include user-defined connections between different users and content (both internal and external). An action logging manager may be used to receive communications from a web server about a user's actions on or off the social networking system 1102. In conjunction with the action log, a third-party content object log may be maintained of user exposures to third-party content objects. An advertisement-pricing module may combine social information, the current time, location information, or other suitable information to provide relevant advertisements, in the form of notifications, to a user.

Authorization servers may be used to enforce one or more privacy settings of the users of the social networking system 1102. A privacy setting of a user determines how particular information associated with a user can be shared. The authorization server may allow users to opt in to or opt out of having their actions logged by the social networking system 1102 or shared with other systems (e.g., the third-party system 1108), such as, for example, by setting appropriate privacy settings.

In some embodiments, the third-party system 1108 may include one or more types of servers, one or more data stores, one or more interfaces, including but not limited to APIs, one or more web services, one or more content sources, one or more networks, or any other suitable components. The third-party system 1108 may be operated by a different entity from an entity operating the social networking system 1102 even if, in some embodiments, the social networking system 1102 and the third-party systems 1108 operate in conjunction with each other. In this sense, the social networking system 1102 may provide a platform, or backbone, which other systems, such as the third-party systems 1108, may use to provide social-networking services and functionality to users across the Internet.

In some embodiments, a third-party system 1108 may include a third-party content object provider. A third-party content object provider may include one or more sources of content objects, which may be communicated to the client device 1106. As an example, content objects may include information regarding things or activities of interest to the user. As another example, content objects may include incentive content objects.

Figure 12:
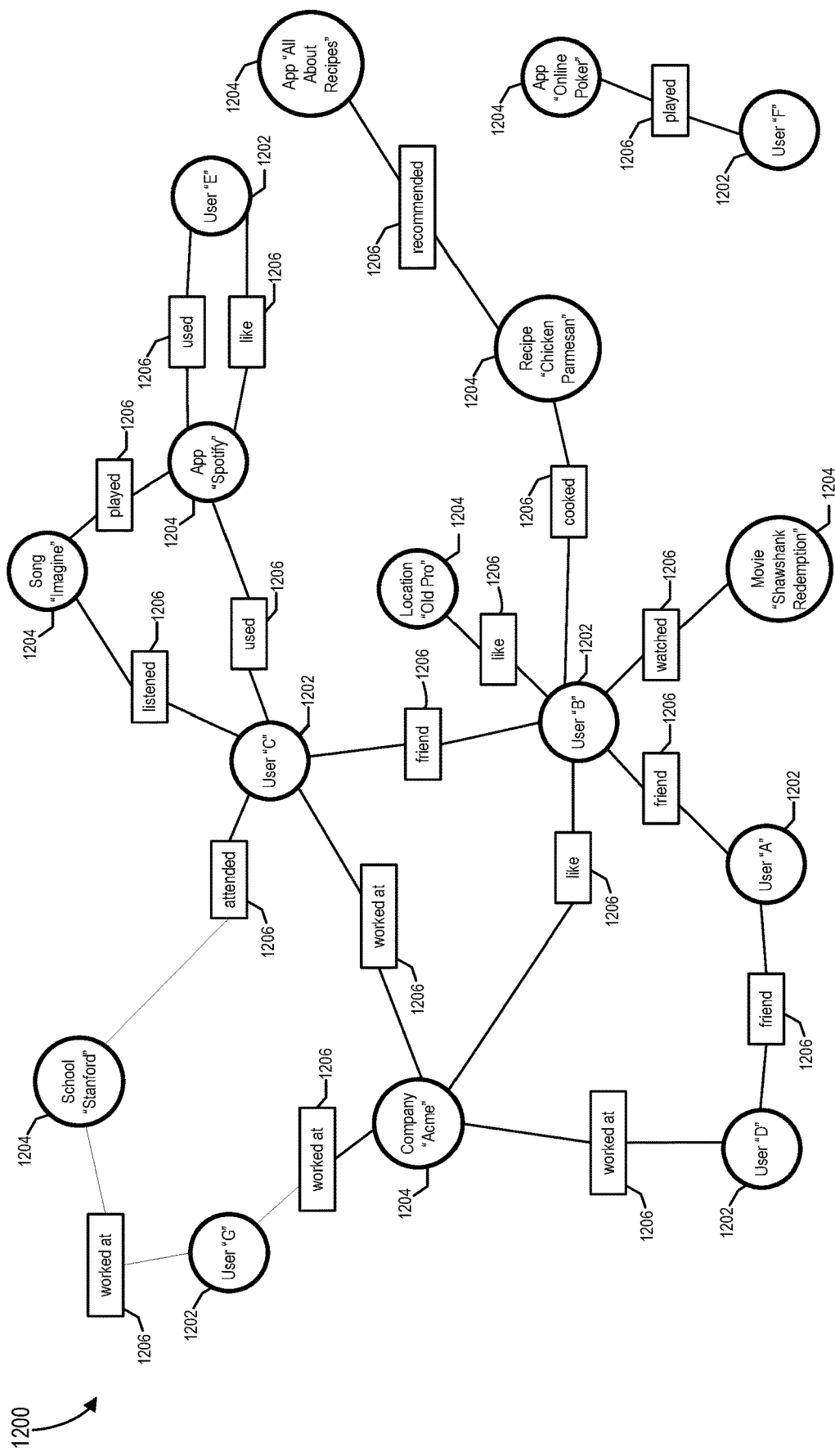
FIG. 12 illustrates an example social graph of a social networking system in accordance with one or more embodiments described herein.

FIG. 12 illustrates an example social graph 1200. In some embodiments, the social networking system 1102 may store one or more social graphs 1200 in one or more data stores. In some embodiments, the social graph 1200 may include multiple nodes—which may include multiple user nodes or multiple concept nodes—and multiple edges 1206 connecting the nodes. The social graph 1200 illustrated in FIG. 12 is shown, for didactic purposes, in a two-dimensional visual map representation.

In some embodiments, a user node 1202 may correspond to a user of social networking system 1102. When a user registers for an account with social networking system 1102, the social networking system 1102 may create a user node 1202 corresponding to the user, and store the user node 1202 in one or more data stores. Users and user nodes 1202 described herein may, where appropriate, refer to registered users and user nodes 1202 associated with registered users.

In some embodiments, a concept node 1204 may correspond to a concept. As an example, a concept may correspond to a place, a website, an entity, a resource, etc. A concept may be located within social networking system 1102 or on an external server. A concept node 1204 may be associated with information of a concept provided by a user or information gathered by various systems, including the social networking system 1102.

In some embodiments, a node in social graph 1200 may represent or be represented by an online profile page. Profile pages may be hosted by or accessible to social networking system 1102. Profile pages may be viewable by all or a selected subset of other users. As an example, a user node 1202 may have a corresponding user-profile page where the corresponding user may add content, make declarations, or otherwise express him or herself. As another example, a concept node 1204 may have a corresponding concept-profile page in which one or more users may add content, make declarations, or express themselves, particularly in relation to the concept corresponding to concept node 1204.

As an example, an edge 1206 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships.

In some embodiments, a pair of nodes in social graph 1200 may be connected to each other by one or more edges 1206. An edge 1206 connecting a pair of nodes may represent a relationship between the pair of nodes. In some embodiments, an edge 1206 may include or represent one or more data objects or attributes corresponding to the relationship between a pair of nodes. As an example, a first user may indicate that a second user is a "friend" of the first user. In response to this indication, the social networking system 1102 may send a "friend request" to the second user. If the second user confirms the "friend request," the social networking system 1102 may create an edge 1206 connecting the first user's user node 1202 to the second user's user node 1202 in social graph 1200 and store edge 1206 as social-graph information in one or more of data stores.

In some embodiments, an edge 1206 between a user node 1202 and a concept node 1204 may represent a particular action or activity performed by a user associated with user node 1202 toward a concept associated with a concept node 1204. As an example, as illustrated in FIG. 12, a user may "liked," "attended," "played," "listened," "cooked," "worked at," or "watched" a concept, each of which may correspond to an edge type or subtype.

In some embodiments, the social networking system 1102, the client device 1106, or the third-party system 1108 may access the social graph 1200 and related social-graph information for suitable applications. The nodes and edges of social graph 1200 may be stored as data objects, for example, in a data store (such as a social-graph database). Such a data store may include one or more searchable or queryable indexes of nodes or edges of social graph 1200.

In some embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition, or as an alternative, an advertisement may be one or more sponsored stories (e.g., a news feed or ticker item on the social networking system 1102).

An advertisement may also include social networking system functionality with which a user may interact. As an example, an advertisement may enable a user to "like" or otherwise endorse the advertisement by selecting an icon or link associated with an endorsement. In addition or as an alternative, an advertisement may include social networking system context directed to the user. As an example, an advertisement may display information about a friend of the user within social networking system 1102 who has taken an action associated with the subject matter of the advertisement.

In some embodiments, the social networking system 1102 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1108 or other suitable systems. An overall affinity for a social-graph entity for each user, subject matter, or type of content may be established. The overall affinity may change based on continued monitoring of the actions or relationships associated with the social-graph entity.

In some embodiments, the social networking system 1102 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions.

Coefficients may be used to predict any number of actions, which may be within or outside of the online social network. As an example, these actions may include various types of communications, such as sending messages, posting content, or commenting on content; various types of observation actions, such as accessing or viewing profile pages, media, or other suitable content; various types of coincidence information about two or more social-graph entities, such as purchasing a product from a merchant.

In some embodiments, the social networking system 1102 may use a variety of factors to calculate a coefficient. These factors may include, for example, user actions, types of relationships between objects, location information, other suitable factors, or any combination thereof. In some embodiments, different factors may be weighted differently when calculating the coefficient. The weights for each factor may be static, or the weights may change according to, for example, the user, the type of relationship, the type of action, the user's location, and so forth. Ratings for the factors may be combined according to their weights to determine an overall coefficient for the user.

To calculate the coefficient of a user towards a particular object, the rating assigned to the user's actions may comprise, for example, 60% of the overall coefficient, while the relationship between the user and the object may comprise 40% of the overall coefficient. In some embodiments, the social networking system 1102 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof.

A coefficient may include a decay factor that causes the strength of the signal provided by particular actions to decay with time, such that actions that are more recent are more relevant when calculating the coefficient. The ratings and weights may be continuously updated based on continued tracking of the actions upon which the coefficient is based. Any process or algorithm may be employed for assigning, combining, averaging, and so forth the ratings for each factor and the weights assigned to the factors. In some embodiments, the social networking system 1102 may determine coefficients using machine-learning algorithms trained on historical actions and past user responses, or data farmed from users by exposing them to various options and measuring responses.

In some embodiments, the social networking system 1102 may calculate a coefficient based on a user's actions. The social networking system 1102 may monitor such actions on the online social network, on the third-party system 1108, on other suitable systems, or any combination thereof. Typical user actions include viewing profile pages, creating or posting content, interacting with content, joining groups, listing and confirming attendance at events, checking-in at locations, liking particular pages, creating pages, and performing other tasks that facilitate social action.

In some embodiments, the social networking system 1102 may calculate a coefficient based on the user's actions with particular types of content. The content may be associated with the online social network, the third-party system 1108, or another suitable system. The social networking system 1102 may analyze a user's actions to determine whether one or more of the actions indicate an affinity for subject matter, content, other users, and so forth.

In some embodiments, the social networking system 1102 may calculate a coefficient based on the type of relationship between particular objects. Referencing the social graph 1200, the social networking system 1102 may analyze the number and/or type of edges 1206 connecting particular user nodes 1202 and concept nodes 1204 when calculating a coefficient. As an example, depending upon the weights assigned to the actions and relationships for the particular user, the overall affinity may be determined to be higher for content about a user's spouse than for content about a user's friend.

In some embodiments, the coefficient may be based on the degree of separation between particular objects. The degree of separation between any two nodes is defined as the minimum number of hops needed to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are not connected directly, but are connected through another user node (i.e., are second-degree nodes) may be described as "friends of friends." The lower coefficient may represent the decreasing likelihood that the first user will share an interest in content objects of the user that is indirectly connected to the first user in the social graph 1200.

In some embodiments, the social networking system 1102 may calculate a coefficient based on location information. Objects that are geographically closer to each other may be considered to be more related, or of more interest, to each other than more distant objects. In some embodiments, the coefficient of a user towards a particular object may be based on the proximity of the object's location to a current location associated with the user (or the location of a client device 1106 of the user). A first user may be more interested in other users or concepts that are closer to the first user. As an example, if a user is one mile from an airport and two miles from a gas station, the social networking system 1102 may determine that the user has a higher coefficient for the airport than the gas station based on the proximity of the airport to the user.

In some embodiments, the social networking system 1102 may perform particular actions with respect to a user based on the coefficient information. The coefficients may be used to predict whether a user will perform a particular action based on the user's interest in the action. A coefficient may be used when generating or presenting any type of objects to a user. The coefficient may also be utilized to rank and order such objects, as appropriate. In this way, the social networking system 1102 may provide information that is relevant to user's interests and current circumstances, increasing the likelihood that they will find such information of interest.

In some embodiments, the social networking system 1102 may generate search results based on the coefficient information. Search results for a particular user may be scored or ranked based on the coefficient associated with the search results with respect to the querying user. As an example, search results corresponding to objects with higher coefficients may be ranked higher on a search-results page than results corresponding to objects having lower coefficients.

In connection with social-graph affinity and affinity coefficients, particular embodiments may utilize one or more systems, components, elements, functions, methods, operations, or steps disclosed in U.S. patent application Ser. No. 11/503,093, filed Aug. 11, 2006, U.S. patent application Ser. No. 12/977,027, filed Dec. 22, 2010, U.S. patent application Ser. No. 12/978,265, filed Dec. 23, 2010, and U.S. patent application Ser. No. 13/632,869, filed Oct. 1, 2012, each of which is incorporated by reference in their entirety.

In some embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. In some embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network.

In some embodiments, one or more servers may be authorization/privacy servers for enforcing privacy settings. In response to a request from a user (or other entity) for a particular object stored in a data store, the social networking system 1202 may send a request to the data store for the object. The request may identify the user associated with the request and may be sent to the user (or the client device 1206 of the user) if the authorization server determines that the user is authorized to access the object based on the privacy settings associated with the object, but not otherwise.

The preceding specification is described with reference to specific exemplary embodiments thereof. The description above and drawings are illustrative and are not to be construed as limiting. The additional or alternative embodiments may be embodied in other specific forms without departing from its spirit or essential characteristics. The scope of the invention is, therefore, indicated by the appended claims rather than by the preceding description. All changes that come within the meaning and range of equivalency of the claims are to be embraced within their scope.

What is claimed is:

1. A method comprising:
monitoring real-time device data received from a recipient client device associated with a recipient, wherein the real-time device data is passively obtained from the recipient client device without express input from the recipient;
analyzing the real-time device data to determine a plurality of behavior characteristics associated with the recipient, wherein a behavior characteristic of the plurality of behavior characteristics comprises the recipient being inactive on a communication thread between a first sender associated with a first sender client device and the recipient;
utilizing, by at least one processor, a communication context model to determine a first communication context of the recipient based on the plurality of behavior characteristics associated with the recipient and the first sender;
providing, prior to the first sender client device sending an electronic communication intended for the recipient, the first communication context to the first sender client device to cause the first sender client device to display a first visual element corresponding to the first communication context of the recipient in connection with the communication thread;
utilizing, by the at least one processor, the communication context model to determine a second communication context of the recipient based on the plurality of behavior characteristics associated with the recipient and a second sender associated with a second sender client device, wherein the second communication context differs from the first communication context; and
providing the second communication context to the second sender client device to cause the second sender client device to display a second visual element corresponding to the second communication context.

2. The method of claim 1, further comprising:
detecting, at the first sender client device, an interaction with the communication thread;
providing the first communication context to the first sender client device in response to detecting the interaction at the first sender client device with the communication thread; and
wherein the first communication context is more specific than the second communication context.

3. The method of claim 1, wherein providing the first communication context to the first sender client device is in response to detecting that the first sender initiated an electronic communication with the recipient at the first sender client device.

4. The method of claim 1, wherein:
the first visual element is a graphical user interface theme that represents the first communication context of the recipient; and
providing the first communication context to the first sender client device causes the first sender client device to display the graphical user interface theme within a communication thread between the first sender and the recipient within an electronic communication application.

5. The method of claim 1, wherein the communication context model comprises one or more of:
a decision tree model;
a linear regression model;
a rule-based algorithm model; or
a machine-learning model.

6. The method of claim 1, wherein the first communication context comprises an indication of an activity, a situation, and/or an environment of the recipient.

7. The method of claim 1, further comprising accessing privacy preferences set by the recipient with respect to a first sender, wherein providing the first communication context of the recipient to the first sender client device is further based on the privacy preferences associated with the first sender.

8. The method of claim 1, further comprising:
receiving, from the first sender client device, an electronic communication delivery request to deliver an electronic communication to the recipient;
determining, in response to receiving the electronic communication delivery request, that the first communication context of the recipient is a negative communication context; and
providing, to the first sender client device associated with a first sender, a confirmation request to deliver the electronic communication to the recipient based on the first communication context of the recipient being a negative communication context, wherein the confirmation request causes the first sender to acknowledge the negative communication context prior to accepting the confirmation request.

9. The method of claim 8, wherein providing the confirmation request to the first sender client device causes the first sender client device to display a notification window indicating the negative communication context.

10. The method of claim 8, wherein providing the confirmation request to the first sender client device based on indicating the negative communication context causes the first sender client device to display one or more selectable delivery options on the first sender client device.

11. The method of claim 10, further comprising:
receiving, from the first sender client device, an acceptance of the delivery option of the confirmation request given the negative communication context; and
providing, in response to receiving the acceptance of the delivery option, the electronic communication to the recipient client device during the negative communication context.

12. The method of claim 10, further comprising:
receiving, from the first sender client device, a rejection of the delivery option of the confirmation request; and
canceling, in response to receiving the rejection of the delivery option, delivery of the electronic communication to the recipient client device.

13. The method of claim 10, further comprising:
receiving, from the first sender client device, a postponement of the delivery option of the confirmation request;
delaying, in response to receiving the postponement of the delivery option of the confirmation request, delivery of the electronic communication to the recipient client device;
detecting a change in the first communication context of the recipient to a second communication context comprising a positive communication context; and
providing, in response to detecting the positive communication context, the electronic communication to the recipient client device.

14. A system comprising:
at least one processor; and
at least one non-transitory computer readable storage medium storing instructions that, when executed by the at least one processor, cause the system to:
monitor real-time device data received from a recipient client device associated with a recipient, wherein the real-time device data is passively obtained from the recipient client device without express input from the recipient;
analyze the real-time device data to determine a plurality of behavior characteristics associated with the recipient, wherein a behavior characteristic of the plurality of behavior characteristics comprises the recipient being inactive on a communication thread between a first sender associated with a first sender client device and the recipient;
utilize a communication context model to determine a first communication context of the recipient based on the plurality of behavior characteristics associated with the recipient and a first sender associated with a first sender client device;
provide, prior to the first sender client device sending an electronic communication intended for the recipient, the first communication context to the first sender client device to cause the first sender client device to display a first visual element corresponding to the first communication context of the recipient in connection with the communication thread;
utilize the communication context model to determine a second communication context of the recipient based on the plurality of behavior characteristics associated with the recipient and a second sender associated with a second sender client device, wherein the second communication context differs from the first communication context; and
providing the second communication context to the second sender client device to cause the second sender client device to display a second visual element corresponding to the second communication context.

15. The system of claim 14, wherein the plurality of behavior characteristics associated with the recipient comprises two or more of a location of the recipient client device, a movement of the recipient client device, a time zone of the recipient client device, social media data associated with the recipient, current biometric data of the recipient, behavioral patterns of the recipient, or device engagement data of the recipient client device.

16. The system of claim 15, further comprising instructions that, when executed by the at least one processor, cause the system to:
predict, based on two or more of the plurality of behavior characteristics associated with the recipient, that the recipient does not want to be interrupted based on inferring that the recipient is sleeping, driving, eating, or exercising; and
assign, based on predicting that the recipient does not want to be interrupted, a negative communication context to the recipient, wherein the negative communication context comprises an indication that the recipient is sleeping, driving, eating, or exercising.

17. A non-transitory computer-readable medium storing instructions that, when executed by at least one processor, cause a computer system to:
monitor real-time device data received from a recipient client device associated with a recipient, wherein the real-time device data is passively obtained from the recipient client device without express input from the recipient;
analyze the real-time device data to determine a plurality of behavior characteristics associated with the recipient, wherein a behavior characteristic of the plurality of behavior characteristics comprises the recipient being inactive on a communication thread between a first sender associated with a first sender client device and the recipient;
utilize a communication context model to determine a first communication context of the recipient based on the plurality of behavior characteristics associated with the recipient and a first sender associated with a first sender client device;
provide, prior to the first sender client device sending an electronic communication intended for the recipient, the first communication context to the first sender client device to cause the first sender client device to display a first visual element corresponding to the first communication context of the recipient in connection with the communication thread;
utilize the communication context model to determine a second communication context of the recipient based on the plurality of behavior characteristics associated with the recipient and a second sender associated with a second sender client device, wherein the second communication context differs from the first communication context; and providing the second communication context to the second sender client device to cause the second sender client device to display a second visual element corresponding to the second communication context.

18. The non-transitory computer-readable medium of claim 17, further comprising instructions that, when executed by at least one processor, cause a computer system to:

determine that the first communication context of the recipient is a negative communication context;

receive an electronic communication to send the recipient; and provide, based on the first communication context of the recipient being negative, a confirmation request comprising one or more selectable delivery options within an electronic communication application before delivering the electronic communication to the recipient client device.

19. The non-transitory computer-readable medium of claim 17, wherein:

the visual element is an emoji that corresponds to the first communication context of the recipient; and the emoji portrays the first communication context of the recipient as sleeping, driving, eating, or exercising.

20. The non-transitory computer-readable medium of claim 19, wherein displaying the visual element comprises displaying the emoji over an icon of the recipient within an electronic communication application.

* * * * *